(12) United States Patent
Lissack

(10) Patent No.: US 9,647,904 B2
(45) Date of Patent: May 9, 2017

(54) CUSTOMER-DIRECTED NETWORKING LIMITS IN DISTRIBUTED SYSTEMS

(71) Applicant: Amazon Technologies, Inc., Reno, NV (US)

(72) Inventor: Avichai Mendle Lissack, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 544 days.

(21) Appl. No.: 14/089,224

(22) Filed: Nov. 25, 2013

(65) Prior Publication Data
US 2015/0149631 A1    May 28, 2015

(51) Int. Cl.
G06F 15/16    (2006.01)
H04L 12/24    (2006.01)
H04L 12/26    (2006.01)

(52) U.S. Cl.
CPC ...... *H04L 41/5051* (2013.01); *H04L 43/0894* (2013.01); *H04L 43/16* (2013.01)

(58) Field of Classification Search
USPC ....................................................... 709/226
See application file for complete search history.

(56) References Cited

U.S. PATENT DOCUMENTS

| | | | |
|---|---|---|---|
| 6,536,043 B1 * | 3/2003 | Guedalia ............... | H04N 7/147 348/E7.071 |
| 6,868,072 B1 * | 3/2005 | Lin ...................... | H04L 12/2803 370/276 |
| 7,124,320 B1 | 10/2006 | Wipfel | |
| 7,532,642 B1 * | 5/2009 | Peacock ............. | H04L 43/0864 370/252 |
| 7,873,074 B1 * | 1/2011 | Boland .................. | H04L 12/14 370/468 |
| 7,917,469 B2 | 3/2011 | Bernhard et al. | |
| 8,260,840 B1 * | 9/2012 | Sirota .................. | G06F 9/5061 370/216 |

(Continued)

FOREIGN PATENT DOCUMENTS

| | | |
|---|---|---|
| EP | 0817433 | 6/1996 |
| EP | 2629470 | 2/2012 |

(Continued)

OTHER PUBLICATIONS

International Search Report and Written Opinion from PCT/US14/67302, Dated Feb. 25, 2015, Amazon Technologies, Inc., pp. 1-13.

(Continued)

*Primary Examiner* — Anthony Mejia
(74) *Attorney, Agent, or Firm* — Robert C. Kowert; Meyertons, Hood, Kivlin, Kowert & Goetzel, P.C.

(57) ABSTRACT

Methods and apparatus for supporting customer-directed networking limits in distributed systems are disclosed. A client request is received via a programmatic interface, indicating a particular lower resource usage limit to be imposed on at least one category of network traffic at a particular instance of a network-accessible service. Resource usage metrics for one or more categories of network traffic at the particular instance are obtained. In response to a determination that resource usage at the particular instance has reached a threshold level, one or more responsive actions are initiated.

20 Claims, 24 Drawing Sheets

(56) References Cited

U.S. PATENT DOCUMENTS

| | | | |
|---|---|---|---|
| 8,385,199 B1 | 2/2013 | Coward et al. | |
| 8,843,633 B2* | 9/2014 | Eriksson | G06F 9/5072 709/226 |
| 8,972,551 B1* | 3/2015 | Yanacek | G06F 15/173 709/200 |
| 9,032,077 B1* | 5/2015 | Klein | H04L 29/08 370/395.21 |
| 9,154,589 B1* | 10/2015 | Klein | H04L 69/329 |
| 9,444,714 B2* | 9/2016 | Rodbro | H04L 43/0852 |
| 2002/0175941 A1* | 11/2002 | Hand | G06F 11/323 715/764 |
| 2002/0198984 A1* | 12/2002 | Goldstein | G06F 11/323 709/224 |
| 2002/0198985 A1* | 12/2002 | Fraenkel | G06F 11/3419 709/224 |
| 2003/0046396 A1* | 3/2003 | Richter | G06F 9/505 709/226 |
| 2003/0225876 A1* | 12/2003 | Oliver | H04L 41/22 709/224 |
| 2004/0109410 A1* | 6/2004 | Chase | H04L 12/2602 370/229 |
| 2006/0095398 A1* | 5/2006 | Bhaskaran | H04L 29/06027 |
| 2006/0159020 A1* | 7/2006 | Porat | H04L 41/0803 370/235 |
| 2006/0250959 A1* | 11/2006 | Porat | H04L 12/5695 370/230 |
| 2007/0056030 A1 | 3/2007 | Kay | |
| 2008/0008095 A1 | 1/2008 | Gilfix | |
| 2008/0049630 A1* | 2/2008 | Kozisek | H04L 41/0823 370/250 |
| 2008/0049640 A1* | 2/2008 | Heinz | H04L 41/0806 370/252 |
| 2008/0052719 A1* | 2/2008 | Briscoe | H04L 41/0806 8/104 |
| 2009/0129289 A1* | 5/2009 | Waggener | H04L 12/2898 370/254 |
| 2009/0219940 A1 | 9/2009 | Jansson | |
| 2011/0029344 A1* | 2/2011 | Weiler | G06Q 10/087 705/7.35 |
| 2011/0199932 A1 | 8/2011 | Short et al. | |
| 2011/0219102 A1 | 9/2011 | Sankaran | |
| 2011/0239259 A1* | 9/2011 | Udani | H04L 12/2807 725/85 |
| 2011/0243072 A1* | 10/2011 | Omar | H04W 8/065 370/329 |
| 2012/0042055 A1* | 2/2012 | Agarwala | G06F 9/5061 709/220 |
| 2012/0148247 A1 | 6/2012 | Skubic et al. | |
| 2012/0159234 A1 | 6/2012 | Mehta et al. | |
| 2012/0226987 A1* | 9/2012 | Wie | G06F 17/30861 715/736 |
| 2012/0250694 A1 | 10/2012 | Hall et al. | |
| 2012/0260133 A1* | 10/2012 | Beck | G06F 11/323 714/38.1 |
| 2012/0260135 A1* | 10/2012 | Beck | G06F 11/323 714/45 |
| 2012/0290725 A1* | 11/2012 | Podila | G06F 9/5011 709/226 |
| 2013/0074091 A1* | 3/2013 | Xavier | G06F 9/5011 8/104 |
| 2013/0077486 A1 | 3/2013 | Keith | |
| 2013/0107707 A1 | 5/2013 | Ramamurthy et al. | |
| 2013/0185427 A1 | 7/2013 | Sterling et al. | |
| 2013/0198324 A1* | 8/2013 | Scorza | G06F 17/30873 709/217 |
| 2013/0227164 A1 | 8/2013 | Kumar et al. | |
| 2014/0071814 A1* | 3/2014 | Landscheidt | H04L 41/0816 370/229 |
| 2014/0075016 A1* | 3/2014 | Chatterjee | H04L 41/5041 709/224 |
| 2014/0189099 A1* | 7/2014 | Hurst | H04N 21/437 709/224 |
| 2014/0189143 A1* | 7/2014 | Muhlestein | H04L 67/60 709/231 |
| 2015/0032854 A1* | 1/2015 | Wang | H04L 65/60 709/219 |
| 2015/0033086 A1* | 1/2015 | Sasturkar | G06F 11/3082 714/57 |
| 2015/0039766 A1* | 2/2015 | Bachar | H04L 47/70 709/226 |
| 2015/0040121 A1* | 2/2015 | Barabash | G06F 9/45558 718/1 |
| 2015/0236965 A1* | 8/2015 | Short | H04L 47/25 709/233 |

FOREIGN PATENT DOCUMENTS

| | | |
|---|---|---|
| WO | 2004034731 | 4/2004 |
| WO | 2007047864 | 4/2007 |
| WO | 2009103236 | 8/2009 |

OTHER PUBLICATIONS

Linuxmanpages.com, Dec. 16, 2001, pp. 1-5.
U.S. Appl. No. 14/071,316, filed Nov. 4, 2013, Avichai Mendle Lissack.
U.S. Appl. No. 14/071,328, filed Nov. 4, 2013, Avichai Mendle Lissack.
U.S. Appl. No. 14/089,230, filed Nov. 25, 2013, Avichai Mendle Lissack.

* cited by examiner

| Instance type 1902 | Outbound bandwidth limit (GB/month) 1904 | | Outbound bandwidth pricing per GB 1906 | | Inbound bandwidth limit (GB/month) 1908 | | Inbound bandwidth pricing per GB 1910 | |
|---|---|---|---|---|---|---|---|---|
| | Category A | Category B | Category A | Category B | Category A | Category B | Category A | Category B |
| Small | a | b | $A.aa | $B.bb | p | q | $P.pp | $Q.qq |
| Medium | c | d | $C.cc | $D.dd | r | s | $R.rr | $S.ss |
| Large | e | f | $E.ee | $F.ff | t | u | $T.tt | $U.uu |
| Extra-large | g | h | $G.gg | $H.hh | v | w | $V.vv | $W.ww |

FIG. 19

CUSTOMER-DIRECTED NETWORKING LIMITS IN DISTRIBUTED SYSTEMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each virtual machine can be thought of as a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As the functionality and features supported by providers of virtualized compute, storage and networking resources grows, and as the fleet of hardware platforms that are used by large-scale providers grows, the implementation of administrative control operations on the platforms, such as managing network traffic flows, can itself become fairly complex. In many cases, the functionality and usability of applications run on such platforms may rely extensively on network communications with other parts of the provider network, and/or with external entities such as clients or third parties. In an attempt to achieve the desired application performance levels, the operators of such distributed systems may have typically set up high bandwidth network infrastructures. However, despite the provisioning of high bandwidth networking devices and links, network bandwidth may in many cases become a bottleneck resource, especially given the time-varying and location-dependent bandwidth requirements for many types of deployed applications. Virtualization may make managing network bandwidth (as well as latency and other networking characteristics) an even harder problem, as the various virtual machines being implemented on a single hardware platform may have widely varying networking requirements that have to be met using the platform's shared networking components, and also because the set of applications and virtual machines instantiated at a given hardware platform may change over time.

BRIEF DESCRIPTION OF DRAWINGS

FIG. 19 illustrates an example of a set of compute instance types that may be implemented for a network-accessible service, with respective bandwidth limits and respective bandwidth usage pricing policies set for the different instance types, according to at least some embodiments.

Figure 1:
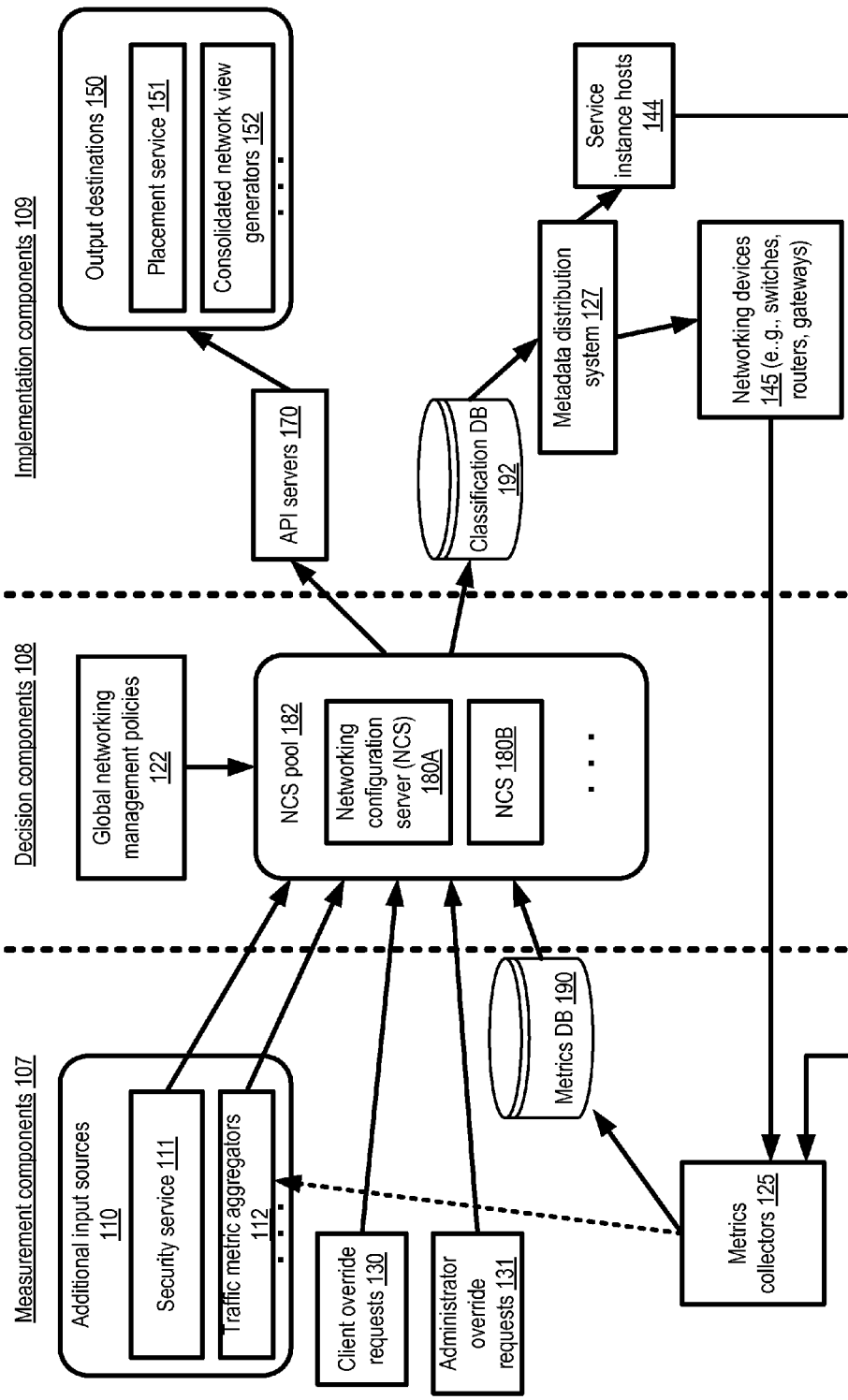
FIG. 1 illustrates an example of a system in which a centralized networking configuration service is implemented to manage network traffic at a plurality of nodes of a distributed computing environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for configuring networking operations in a large-scale distributed system such as a provider network are described. In some embodiments, a centralized networking configuration management scheme may be implemented, according to which various types of decisions regarding bandwidth limits, latency management, and other traffic shaping parameters for numerous nodes (such as hosts and network devices) of the distributed system may be made at one or more networking configuration servers (NCSs). (In some embodiments networking configuration servers may also be referred to as "bandwidth arbitration servers", as the servers' primary responsibility may be to manage bandwidth usage at components of a distributed system via the imposition of respective bandwidth limits for various traffic categories.) Metadata to be used to implement the decisions, including for example traffic classification procedures or rules and networking configuration options for various categories of traffic, may be transmitted in a portable, easy-to-parse format from the NCSs to the nodes of the distributed system. At the nodes of the distributed system, the received metadata may be interpreted, for example by networking management modules within virtualization management software, to classify packets or other units of network traffic schedule as they are generated or received, and to apply the decisions made at the BASs to schedule and/or throttle transmissions of the traffic. The responsibility of generating the logic to be used for traffic shaping (which may at least in some cases require analysis of non-trivial input data sets obtained from a variety of sources) may thus be handled by the centralized networking configuration servers, and the logic may be applied at the various nodes by relatively simple control modules. The metadata transmitted to a given node may be customized specifically for that node in at least some embodiments, based on metrics collected from the node, the nature of the applications being run on that node, and so on. The networking configuration management techniques may include support for programmatic interfaces that enable clients of the distributed systems to obtain unified or consolidate views of the networking-related status of resources of interest in some embodiments. In at least some embodiments, resource usage indicators (such as ratios of measured bandwidth to applicable bandwidth limits) may be displayed using heat maps or other visualization tools. Programmatic interfaces may also be implemented in at least some embodiments to enable clients and/or administrators to submit various types of configuration requests to the centralized networking configuration system, which may for example result in changes to the classification-related rules and/or networking settings determined at the NCSs and disseminated to various nodes. In at least some embodiments, clients may be able to request reductions in the bandwidth limits (or other types of resource usage limits) on various resources such as service instances. In at least some implementations, part or all of the networking configuration scheme may be implemented as a web service, e.g., one or more web services programmatic interfaces may be supported for various types of interactions with the networking configuration servers.

In much of the following description, a provider network is used as an example of a distributed system in which the centralized networking configuration techniques may be implemented. Networks set up by an entity such as a company or a public sector organization to provide one or more network-accessible services (such as various types of cloud-based database, computing or storage services) accessible via the Internet and/or other networks to a distributed set of clients may be termed provider networks herein. At least some of the services may be packaged for client use in service units called "instances": for example, a virtual machine instantiated by a virtualized computing service may represent a "compute instance", and a storage device such as a block-level volume instantiated by a storage service may be referred to as a "storage instance". In some embodiments, instances of higher-level services may be packaged using compute instances and/or storage instances—e.g., a database instance may be built using a combination of compute and storage instances in some embodiments. Computing devices such as servers and/or storage devices at which such units of various network-accessible services of a provider network are implemented may be referred to as "instance hosts" or more simply as "hosts" herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network.

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. In at least some embodiments, a virtualized computing service offering various types of compute instances may be implemented within the provider network, and such compute instances may be allocated to clients. Other services of the provider network may be accessed from such compute instances as well as from external locations. It is noted that although provider networks serve as one example context in which many of the bandwidth management techniques described herein may be implemented, those techniques may also be applied to other types of distributed systems than provider networks, e.g., to large-scale distributed application environments in which different components of the applications may have time-varying bandwidth needs.

According to at least one embodiment, a number of NCSs may be instantiated at various locations within a provider network, with the number and distribution of NCSs being determined, for example, based on performance and/or availability criteria as described below. The NCSs may be configured to obtain network-related metrics from various nodes of the provider network, such as from instance hosts of various types of services being implemented in the provider network, and/or from various types of network devices (switches, routers, gateways and the like) to help in making bandwidth management decisions. For example, information regarding the actual incoming and outgoing network traffic at a given host during a time interval, the number of packets dropped during a time interval, the number of packets whose transmission was delayed due to enforcement of current bandwidth limits, the sizes of the packets, the applications on whose behalf the traffic occurred to or from a given node, the clients on whose behalf the traffic was initiated, and/or the IP addresses of the endpoints involved in various transmissions, may be collected in various embodiments. In some embodiments, input from other sources may also be used in making bandwidth management decisions: for example, security services may be implemented in some provider networks to attempt to identify network intrusions or attacks such as distributed denial of service (DDOS) attacks, and alerts regarding potential attacks may influence bandwidth limit changes or traffic category definitions. In at least one embodiment, a provider network may include services that aggregate network traffic metrics on a per-IP-address basis or on a per-client basis, e.g., for administrative and/or billing purposes, and such aggregators may also provide input to the NCSs. In some embodiments, clients and/or administrators of one or more network-accessible services of the provider network may submit bandwidth-related requests or other configuration requests to the NCSs, e.g., to override one or more bandwidth management parameters for a specified instance host or network device, and such requests may also contribute to the decisions made at the NCSs.

Based at least in part on such inputs, a given NCS may determine various networking configuration options and/or procedures to be used at a given node of the provider network. In some cases, one or more global and/or local networking management policies may also be taken into account when determining the parameters. In one embodiment, a set or hierarchy of traffic categories may be determined, together with various networking configuration options such as bandwidth limits, latency goals or constraints, and so on, for each of the categories. In some implementations a flat classification (equivalent to a hierarchy with just one level) may be used, while in other implementations multi-level hierarchies with parent-child relationships between nodes of different levels may be used. In the subsequent description, the term "hierarchy" as used herein, is intended to cover both single-level or flat classifications and multi-level classifications indicating parent-child relationships. In addition to the hierarchy, a procedure (e.g., a sequence of decision steps or rules to be applied) to be used to classify any given network packet (or any appropriate unit of data transfer) into one of the categories may also be determined. The information regarding traffic categories and the logic or rules to be used to map traffic units to the categories may together be termed "traffic classification metadata" or "classification metadata" herein. Since a given host may comprise different combinations of service instances than another host in at least some embodiments, and the networking requirements of the applications being implemented at the service instances of a given host may differ from the networking requirements of other applications (either at the same host or at other hosts), different sets of networking configuration parameters may be appropriate for different hosts. In at least some embodiments, therefore, classification metadata may be customized for at least some nodes—e.g., the classification metadata generated for one node of the provider network, such as an instance host IH1, may differ from the classification metadata generated for a different node, such as instance host IH2. Different sets of traffic categories may be defined for the different nodes, for example, or different bandwidth limits or latency requirements may be set for the same traffic category, or at least some steps of the traffic unit classification procedure may differ. In at least some implementations, the networking configuration parameters determined for various network devices, such as for switches, routers, gateways, or load-balancers, or for network-attached storage devices, may be derived at least in part from the bandwidth management parameters of a set of hosts associated with or affected by the devices—e.g., if a particular switch is used for incoming and outgoing traffic to eight hosts, the bandwidth limits of the switch for a certain category of traffic may be derived from the bandwidth limits of the eight hosts.

The traffic categories defined by a NCS for a given node may differ from one another in various properties in different embodiments. In one embodiment, different categories may be created for different sets of network endpoints—e.g., the IP (Internet Protocol) addresses of the destinations (or sources) of traffic may be used to categorize the traffic. In another embodiment, the kinds of application on whose behalf the traffic flows may be used for traffic categorization—e.g. database-related traffic may be placed in one category, and traffic related to high performance computing may be placed in another category. In some embodiments, the clients on whose behalf the traffic is generated, and/or the budgets of the clients or aspects of contractual agreements reached with the clients, may be used to define traffic categories. In some embodiments in which a plurality of network-accessible services are implemented in the distributed system, traffic categories may be defined on the basis of the service on behalf of which a particular unit of traffic is generated. If service-based classification is being used and a given packet is associated with two or more services, e.g., if a packet of data is being transferred from a storage service on behalf of a database instance of a database service, the packet may be classified as belonging to the source service (i.e., the sending side) or the destination service (the receiving side) in various embodiments. In at least one embodiment, clients may provide indications of one or more properties that can be used by the networking configuration service to classify traffic units—for example, a client may request that some set of compute instances be identified a high-priority instances at least temporarily, and the traffic to or from those instances may accordingly be classified as high-priority traffic with high bandwidth limits.

In some embodiments, an NCS may use a tree or similar hierarchical data structure to model or represent the traffic categories for a given provider network node, with respective bandwidth limits and/or other networking configuration options being assigned to each node of the tree. In at least some implementations, a bandwidth summation policy may apply to a classification tree. According to such a policy, if a given parent node P with child nodes C1, C2, . . . , Ck in the tree has a bandwidth limit of X bits/second, the sum of the actual traffic associated with the child nodes C1, C2, . . . , Ck during a given time period may not exceed the bandwidth limit of the parent. Consider an example in which P's bandwidth limit is set to 1 Gbit/second for outgoing traffic, and P has two child nodes C1 and C2, each of whose bandwidth limit is also set to 1 Gbit/second for outgoing traffic. If, during a given second, 0.6 Gbit of traffic classified as C1 traffic flows from the instance, no more than 0.4 Gbit of traffic classified as C2 traffic may be permitted, even though the individual limit defined for C2 is higher. Summation policies based on parent-child relationships may not be relevant or useful for some types of networking configuration options determined by NCSs in various embodiments, of course, such as latency constraints or goals, quality-of-service goals, packet fragmentation settings, or settings determined at least in part on packet sizes.

In addition to using a tree or tree-like structure to represent the set of traffic categories, in some embodiments the NCS may also generate a second data structure to model the procedure to be used to classify traffic units into the categories. The second data structure, which may be termed a classification procedure graph, may comprise one or more sequences of decision nodes in some implementations, in which each successive node of a given sequence indicates one or more criteria to be used to classify a traffic unit to a narrower category. In at least one implementation, some of the decision nodes of the classification procedure graph may include a lookup table (such as a hash table) that may be used for selecting one category from multiple category choices. The entries of the lookup table may be indexed based on one or more properties of the network traffic units that are to be classified—e.g., a portion or all of a destination or source IP address may be used for indexing, or a portion of another packet header field or even the contents of the body of the packet may be used to look up a particular entry in the table. In at least some embodiments, a lookup table entry may in turn lead to another classification procedure graph or sub-graph. Thus, in such implementations, a given property of a packet may first lead to a selection of a lookup table entry from among several possible lookup table entries, and then the processing of the selected lookup table entry in turn may lead to the traversal of another set of decision nodes (which may themselves include other lookup tables), ultimately concluding in the identification of the category of the packet. Fairly elaborate fine-grained category mappings may be defined for network packets and/or other traffic units using such procedure steps in various embodiments, enabling sophisticated traffic shaping. Different classification hierarchies and/or procedures may be generated for incoming and outgoing traffic in at least some implementations.

Having generated metadata comprising a set of traffic categories with associated networking configuration options, and logic to map network traffic units into the categories, in some embodiments an NCS may generate portable representations of the metadata for transmission to the nodes where the metadata is to be applied. For example, in various implementations, one or both components of the metadata may be encoded according to an industry standard protocol or language such as JSON (JavaScript Object Notation), XML (Extensible Markup Language), YAML (a serialization format whose acronym has a number of possible expansions such as "Yet Another Markup Language" or "YAML Ain't Markup Language"). In other implementations, a proprietary encoding technique or protocol may be used to generate the portable versions of the data structures.

The portable representations may be transmitted to the target node of the provider network or distributed system, e.g., to a control/administrative module such as a network management module than can parse the representations and implement the procedure indicated by the procedure graph. Using the received metadata, various traffic units may subsequently be classified into the appropriate categories at the target node, and various network transmissions may be scheduled and/or throttled or delayed in accordance with networking configuration options such as bandwidth limits or latency requirements indicated for their respective traffic categories. Metrics collected during such transmissions may be fed back to the NCSs, enabling refinement of the metadata for subsequent time periods. Thus, a feedback loop may be established between the NCSs and the nodes at which the decisions made at the NCSs are ultimately implemented, allowing dynamic adjustment of networking management parameters over time. Using such customizable traffic classification and configuration techniques may enable the centralized networking configuration system to control and shape traffic at various parts of the provider network to any desired level of granularity in various embodiments.

Various approaches may be used for the distribution of the classification metadata to the target nodes in different embodiments. For example, in one embodiment, an NCS may be configured to periodically (e.g., at least once every X minutes) "push" classification metadata to each of the hosts and/or network devices to which the NCS has been assigned. In some embodiments, various types of triggering events (such as the detection of potential network intrusions or attacks) may lead to the dissemination of new classification metadata. For example, an attempt to mitigate or limit the impact of an attack, bandwidth limits at some set of nodes may be lowered, or new categories with low bandwidth limits may be defined, as described below in further detail. In another embodiment, at least some nodes of the provider network may "pull" traffic classification metadata from their assigned NCSs, e.g., by sending metadata requests to the NCSs and receiving the metadata in response. In some embodiments, combinations of the scheduled push technique, the triggering event-based distribution of metadata, and/or the node-initiated pull technique, may be used.

In some embodiments a provider network or other distributed system may be organized into a plurality of geographical regions, and each region may include one or more availability containers, which may also be termed "availability zones" herein. An availability container in turn may comprise one or more distinct locations or data centers, engineered in such a way that the resources in a given availability container are insulated from failures in other availability containers. That is, a failure in one availability container may not be expected to be temporally or causally correlated with a failure in any other availability container; thus, the availability profile of a resource instance or control server is intended to be independent of the availability profile of resource instances or control servers in a different availability container. Clients may be able to protect their applications from failures at a single location by launching multiple application instances in respective availability containers. At the same time, in some implementations, inexpensive and low latency network connectivity may be provided between resource instances that reside within the same geographical region (and network transmissions between resources of the same availability container may be even faster). To achieve desired levels of availability and/or performance for the networking configuration system, in some such embodiments, at least one networking configuration server may be set up in each availability zone. In some embodiments, at least one NCS may be established within each data center. In some embodiments, the number of NCSs to be set up within a given region, availability container or data center may be determined based at least in part on performance requirements—e.g., on how quickly the networking configuration system can respond to network attacks or other triggering events by generating modified bandwidth limits and applying the modified limits at the appropriate set of nodes.

According to one embodiment, one or more programmatic interfaces (such as APIs (application programming interfaces), web pages, command-line tools, graphical user interfaces, and the like) may be implemented by the networking configuration system, for use by clients and/or other services of the provider network. In one such embodiment, as mentioned above, clients or administrators of various services may submit configuration requests such as bandwidth override requests to set or change networking configuration options for specific service instances or hosts. Some clients may wish to increase (or decrease) bandwidth limits for at least some applications for at least some time intervals, for example. In some embodiments, a given client may be allocated numerous service instances (such as hundreds or thousands of compute instances, storage instances, database instances, and the like) and the client may wish to obtain an up-to-date consolidated view of the networking status (including applicable bandwidth limits, latency settings and the like) of a subset of their service instances. The networking configuration service's programmatic interfaces may be used to provide such a unified view in some embodiments, e.g., by a console service of the provider network or by some other consolidated network view generators. The programmatic interfaces may also be used by other services in some embodiments, such as an instance placement service that is responsible for identifying the instance hosts at which new service instances are to be launched. When considering a particular instance host as a candidate for a new service instance, such a placement service may obtain information from the networking configuration service using on the programmatic interfaces, such as recent bandwidth usage trends at the candidate, the number of times network transmissions have recently been throttled and/or the currently established network bandwidth limits or latency settings for that instance host, and use such information in determining the placement of the new service instance.

Example System Environments

Figure 2:
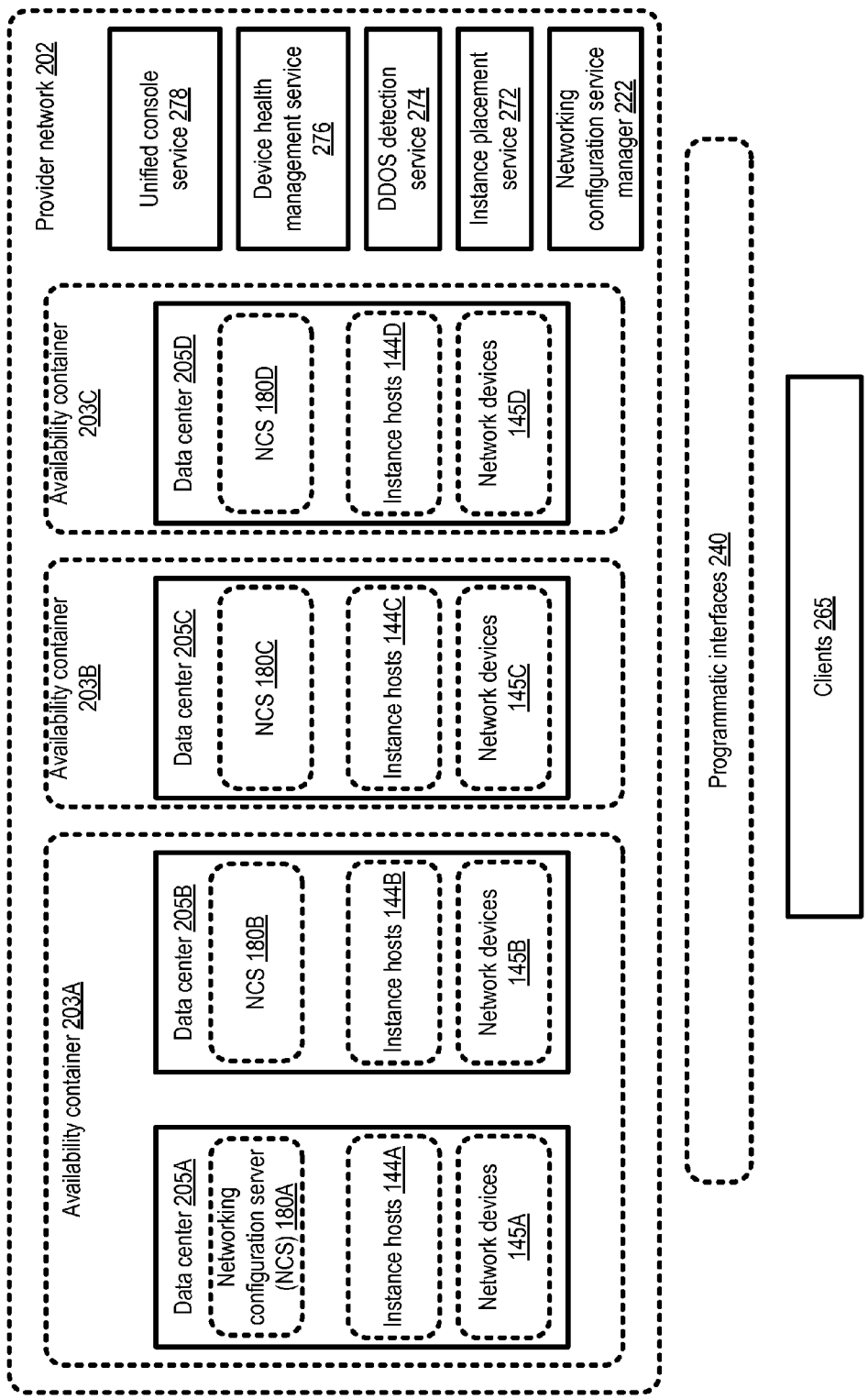
FIG. 2 illustrates an example of a provider network environment in which respective networking configuration servers are established in each of several availability containers, according to at least some embodiments.

FIG. 1 illustrates an example of a system 100 in which a centralized networking configuration service is implemented to manage network traffic at a plurality of nodes of a distributed computing environment, according to at least some embodiments. As shown, a pool 182 of networking configuration servers 180 such as NCS 180A and NCS 180B may be established. In some embodiments, the NCSs 180 may be distributed among various data centers of the computing environment, as illustrated in FIG. 2 and described below. A given NCS 180 may for example comprise one or more software and/or hardware modules in different embodiments, and may itself be implemented using a plurality of computing devices in some cases. The NCSs 180 may be configured to receive inputs from several different types of sources. Customizable traffic classification logic and networking configuration options such as bandwidth limits to be applied at various elements of the distributed computing environment may be determined by the NCSs on the basis of the inputs and/or in view of global networking management policies 122 in the depicted embodiment. From the perspective of the networking configuration service, the elements of the distributed computing environment may be classified into three high-level categories: measurement-related components 107, decision components 108, and implementation components 109. The measurement-related components 107 may comprise various input sources for the NCSs; the decision components 108 may comprise the NCSs themselves; and the implementation components 109 may represent entities at which the decisions are executed to shape network traffic, or where output generated by the decision components is utilized for other purposes. A feedback loop, similar to a classical control system feedback loop, may be established by obtaining measurements from some of the implementation components (such as service instance hosts 144 and/or network devices 145) and using those metrics to determine subsequent decisions by the NCSs 180, which may in turn be implemented, leading to additional measurements that in turn influence future decisions.

A number of types of networking-related metrics may be gathered from instance hosts 144 and/or networking devices 145 e.g., by metrics collectors 125, and placed in a metrics database 190 accessible by the NCSs 180 in the depicted embodiments. For example, such metrics may include the incoming and outgoing network traffic rates at a given host during a time interval (e.g., expressed in bytes or in packets), the number of network connections corresponding to various protocols such as TCP (Transmission Control Protocol) or UDP (User Datagram Protocol), the number of packets dropped during a time interval and the causes of the packet drops, the number of packets whose transmission was delayed due to enforcement of current bandwidth limits, the distributions of the sizes of the packets, the applications on whose behalf the traffic occurred to or from a given node, the clients on whose behalf the traffic was initiated, latencies associated with packet delivery, and/or the IP addresses of the endpoints involved in various transmissions. In addition to the metrics stored in database 190, the NCSs may also receive input from additional input data sources 110 of system 100, such as security service 111 or traffic metric aggregators 112 A security service 111 may be configured to monitor traffic patterns at various parts of the system 100 to detect network intrusions or attacks (some of which may originate outside the system 100, e.g., from various locations on the public Internet, while others may originate at some of the instance hosts 144 themselves). When a suspicious traffic pattern is detected, e.g., if there is a sudden and sustained burst of high traffic directed to a given network address, the security service 111 may inform the NCSs 180, which may take mitigating actions. For example, the NCSs 180 may generate new traffic categories and corresponding bandwidth limits to be applied, or alter the bandwidth limits of existing categories, and transmit the newly-modified or generated classification metadata to the appropriate hosts to limit the impact of the potential security event. Traffic metric aggregators 112 may combine metrics transmitted from the collectors 125 into buckets, e.g., per-IP-address buckets or per-client buckets, and representations of the buckets may be made available to the NCSs, to be considered when making networking configuration decisions.

In the embodiment shown in FIG. 1, client override requests 130 and/or administrator override requests 131 may also play a role in the decisions made by the NCSs 180. For example, based on the global policies 122 and other metrics, a NCS 180 may determine that the bandwidth limit for a given category C1 of traffic at an instance host 144 is to be set to 2 Gbit/sec for the next time interval being considered. However, a client whose compute instance happens to be instantiated at that instance host may submit a request for 5 Gbit/sec bandwidth for that compute instance, or an administrator of a service being implemented at that instance host may submit a request to limit the bandwidth to 1 Gbit/sec, and such requests may be used by the NCSs to override other factors in the depicted embodiment. In embodiments in which clients are charged billing amounts for network traffic in proportion to the amount of traffic incurred on their behalf, some clients may wish to impose upper limits on their bandwidth usage to control costs, and such upper limits may also represent examples of override requests 130.

According to some embodiments, a given NCS 180 may generate traffic classification metadata for one or more instance hosts 144 and/or network devices 145 to which the NCS has been assigned. In at least some embodiments, classification metadata may be generated for storage devices as well, such as for network-attached storage (NAS) devices. The metadata may comprise a hierarchy of one or more levels of traffic categories, which may be represented as a tree data structure, for example, in which each node of the tree represents a respective traffic category and has an associated set of networking configuration options or settings (such as bandwidth limits or latency requirements). In some embodiments, traffic summation policies may apply to the classification trees, as described below with reference to FIG. 5, according to which the actual traffic rates for traffic categories represented as child nodes of a parent node may not exceed the bandwidth limit of the parent node. In some embodiments in which respective classification trees are generated for each instance host 144, the host-level classification trees may be combined into rack-level trees or even data-center level classification trees by the NCS 180, as described below with reference to FIG. 6. Such higher-level trees may be used, for example, to obtain a wider perspective on network traffic flow, and/or for making higher-level decisions than are possible per instance host or per network device.

Figure 6:
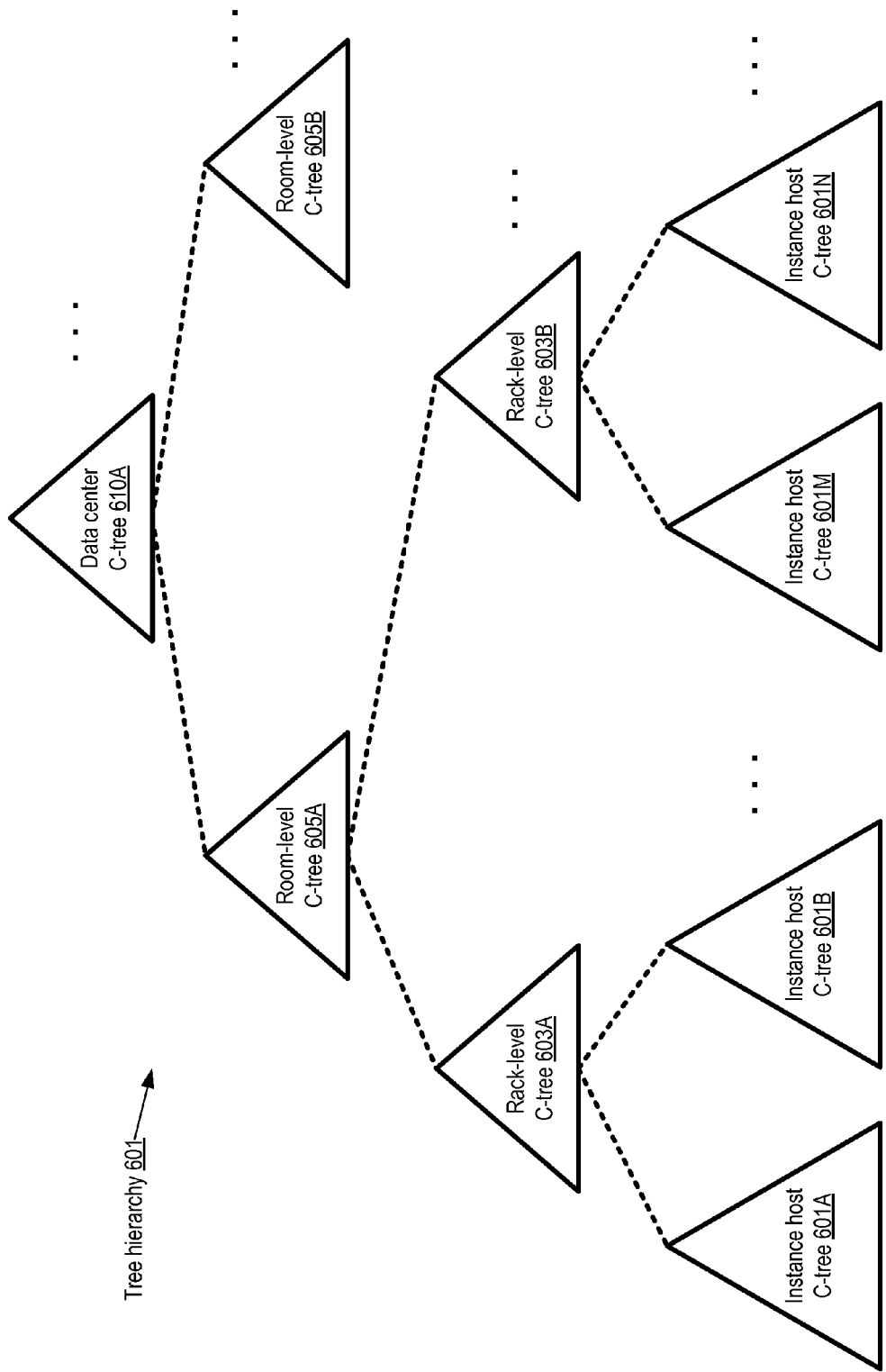
FIG. 6 illustrates an example of a hierarchical data structure that may be used to combine network traffic category information of a plurality of instance hosts at a data center, according to at least some embodiments.
Figure 7:
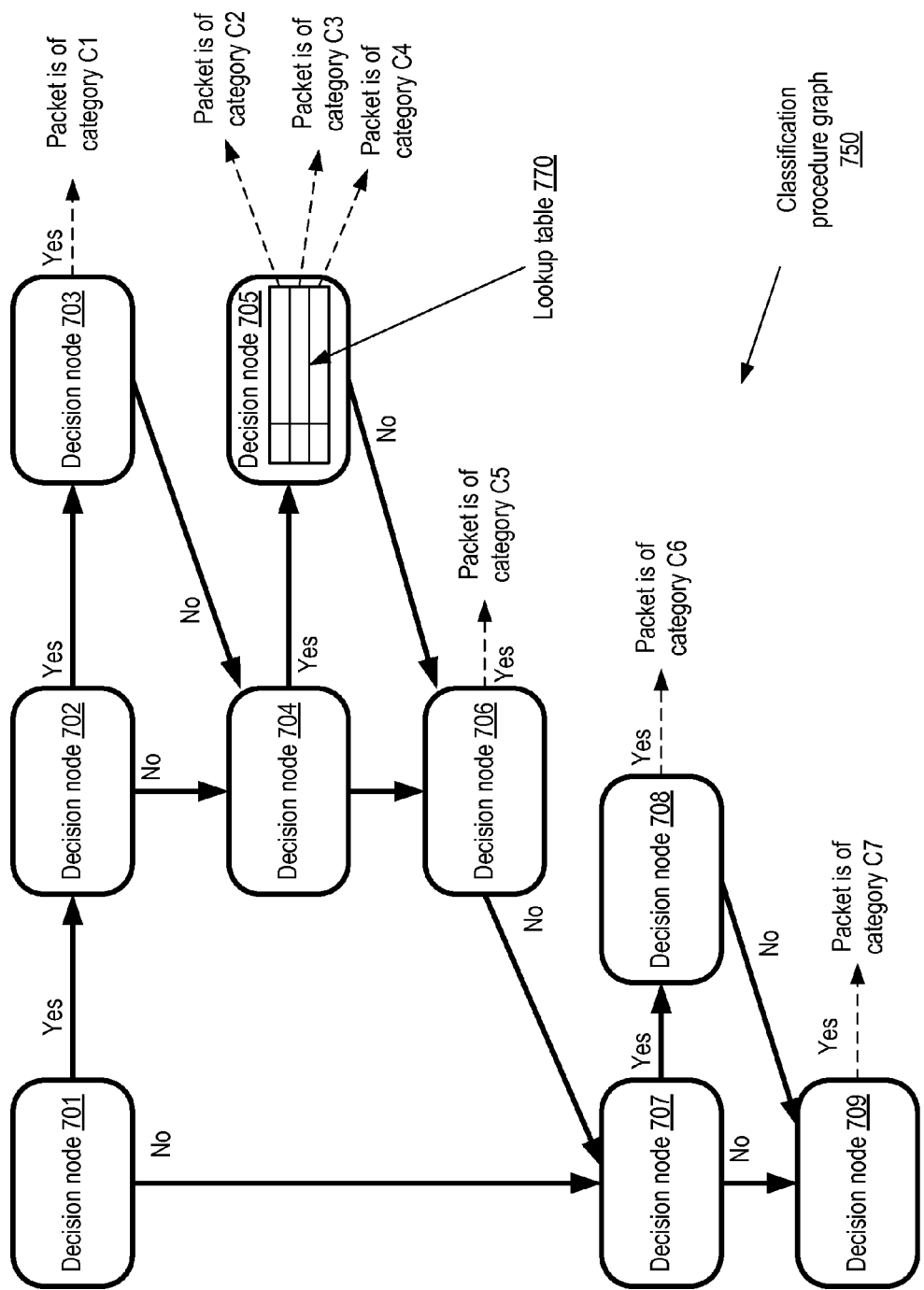
FIG. 7 illustrates an example of a traffic classification procedure graph that may be used together with a classification tree to determine the category of a unit of network traffic, according to at least some embodiments.

In addition to the classification trees, the traffic classification metadata may also include procedures to be used to map network traffic units such as packets to the various categories defined in the classification trees in the depicted embodiment. The steps of the procedures may be represented, for example, as decision nodes of procedure graphs. A given procedure graph may comprise one or more decision node sequences in some implementations, in which successive nodes include indications of criteria to be used to match network traffic units to successively narrower traffic categories. In at least one implementation, some decision nodes may include lookup tables such as hash tables. Using such a lookup table node, a given packet or traffic unit may be mapped to one of many different categories using a single graph node, thus reducing the size and complexity of the procedure graphs. In some cases lookup table node entries may serve as pointers to other procedure graphs or subgraphs, thus enabling fine-grained classification logic or criteria to be used. Examples of procedure graphs and decision nodes incorporating lookup tables are shown in FIG. 6 and FIG. 7 and described below in further detail. In at least some embodiments, the classification metadata may be stored in a classification database 192, in addition to being distributed to the appropriate instance hosts 144 and/or network devices 145.

Figure 3:
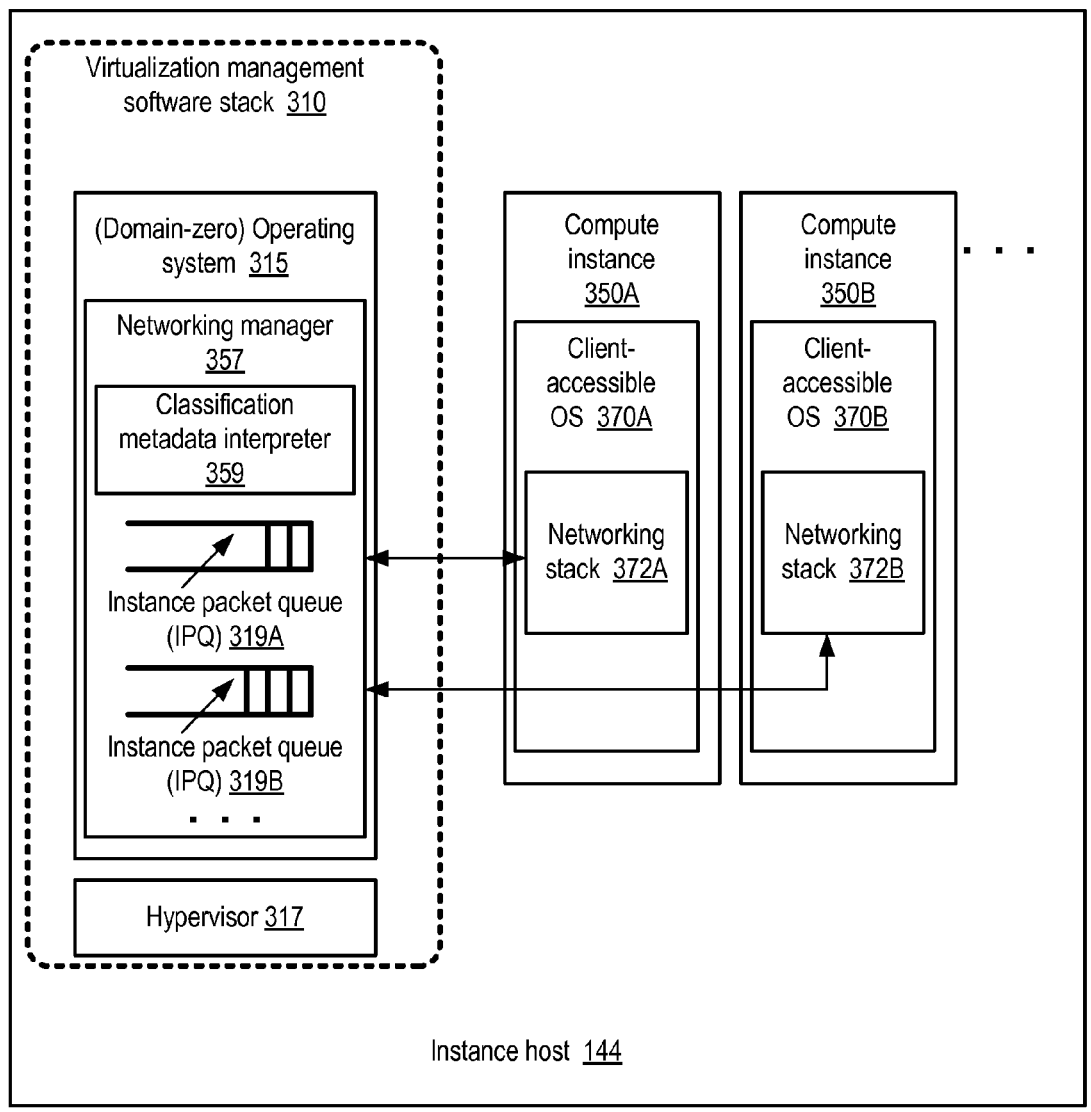
FIG. 3 illustrates an example of a networking manager module capable of interpreting traffic classification metadata at an instance host of a virtualized computing service, according to at least some embodiments.

According to some embodiments, the metadata generated at the NCSs 180 may be transmitted to their intended destinations via distribution system 127. Distribution system 127 may itself comprise a plurality of intermediary nodes in some implementations, which may also be used for distributing other types of metadata to various nodes of the system 100, such as routing information and/or access control lists. In embodiments in which database 192 is used as a repository of generated metadata, nodes of the distribution system 127 may for example be notified (e.g., by subscribing to a notification mechanism) when the database 192 is updated, and may transfer the new metadata to the appropriate destinations accordingly. In some embodiments, portable representations of the metadata (e.g., the classification trees and procedures) may be generated, either by the NCSs themselves or by the distribution system 127, using protocols such as JSON, XML, YAML or proprietary techniques or languages. In one implementation, the portable representations may be stored in database 192. At the destinations, the received metadata representations may be parsed, e.g., by networking management modules of virtualization management software stacks in the case of instance hosts 144, as illustrated in FIG. 3 and described in further detail below.

In one embodiment, one or more API servers 170 may be set up to handle requests directed at the NCSs 180 from other output destinations 150 of the implementation subsystem 109. For example, one or more servers may be configured as consolidated network view generators 152, to provide clients with a unified view of the networking status of selected portions of the distributed environment. In one implementation, for example, clients may be assigned hundreds or thousands of service instances at various instance hosts, and may be able to view various types of metrics (such as recent incoming/outgoing traffic rates, dropped packet rates, applicable bandwidth limits and the like) for their instances via a console implemented by the view generators 152. In at least one embodiment, a placement service 151 may also be able to access network bandwidth limits and other metrics from the NCSs via the API servers 170, which may be helpful in making decisions regarding the instance hosts to be used for new service instances that are to be launched, or in moving existing service instances to instance hosts with less bandwidth contention.

FIG. 2 illustrates an example of a provider network environment in which respective networking configuration servers are established in each of several availability containers, according to at least some embodiments. As shown, provider network 202 may comprise several availability containers 203, such as 203A, 203B and 203C in the depicted embodiment. Each availability container may in turn comprise one or more data centers 205, such as data centers 205A and 205B in availability container 203A, data center 205C in availability container 203B, and data center 205D in availability container 203C. As described earlier, each availability container 203 may be designed and engineered in such a way (e.g., with respective independent infrastructure elements such as electrical power sources, and with some geographical distance between different availability containers) that the effects of various types of failure events in any given availability container may typically be limited to that availability container. Hence, failures and/or errors may typically not spread across availability container boundaries, and the different availability containers may be deemed to have independent failure profiles or independent availability profiles. Even if a given availability container suffers a natural disaster, for example, other availability containers may be expected to remain operational.

In keeping with the design goal of avoiding or reducing cross-availability-container dependencies, at least one NCS 180 may be established in each availability container 203 in the depicted embodiment. For example, NCSs 180A and 180B are set up respectively in data centers 205A and 205B of availability container 203A, NCS 180C is established in data center 205C of availability container 203B, and NCS 180D is located in data center 205D of availability container 203C. NCS 180A may be configured to generate classification metadata for instance hosts 144A of one or more network-accessible services (such as a virtualized computing service or a storage service) being implemented at data center 205A, and for network devices 145A located in data center 205A. Similarly, NCS 180B may be assigned the task of generating classification metadata for instance hosts 144B and network devices 145B, NCS 180C may be responsible for generating classification metadata for instance hosts 144C and network devices 145C, and NCS 180D may be configured for generating classification metadata for instance hosts 144D and network devices 145D. Although a single NCS is shown in each data center 205 in the embodiment illustrated in FIG. 2, a plurality of NCSs may be set up in a given data center 205 (depending on, for example, performance requirements and/or on the number of nodes for which metadata has to be generated at the data center) in at least some embodiments. In one embodiment, if an availability container (such as 203A) comprises N data centers, and the performance requirements for bandwidth management can be met by fewer than N NCSs, some data centers need not have any NCSs configured—instead, a single NCS may suffice for more than one data center. In other embodiments, a given NCS 180 may be configured to generate metadata for nodes at more than one availability container.

The number and placement of the NCSs 180 may be determined by a networking configuration service manager 222 in the depicted embodiment. The NCS manager 222 may itself comprise a plurality of hardware and/or software components in some implementations, some of which may be distributed across the data centers 205 of various availability zones 203. Configuration changes for the NCSs 180 may be initiated by the NCS manager as needed in the depicted embodiment—e.g., when a new version of a software module used by NCSs is to be deployed, the deployments may be orchestrated by the NCS manager.

A number of other services of the provider network may interact with the networking configuration system in the depicted embodiment. For example, a unified console service 278 may implement one or more programmatic interfaces 240 (such as web pages, APIs, GUIs, and/or command-line tools) enabling clients 265 to submit queries regarding networking status of resources of interest and to receive the requested information programmatically. The unified console service 278 may represent one example of a consolidated network view generator 152 of FIG. 1. Programmatic interfaces 240 may also enable clients to submit configuration requests—e.g., to raise or lower currently applicable bandwidth limits on various service instances or instance hosts for specified time periods.

A device health management service 276 may be implemented at the provider network 202, to collect (e.g., using a heartbeat mechanism) responsiveness information from various instance hosts and network devices in some embodiments. In the depicted embodiment, the health management service 276 may also be used for the collection of networking-related metrics to be used as input by the NCSs 180, e.g., by piggybacking networking metrics on health status messages. Thus, nodes of the health management service 276 may be considered examples of metrics collectors 125 illustrated in FIG. 1 The health management service may also be used as a metadata distribution system 127 in some embodiments—e.g., heartbeat messages sent to various instance hosts may include piggybacked classification metadata. A DDOS detection service 274 may be configured to detect denial of service attacks at targets within the provider network and/or denial of service attacks that may have been initiated from within the provider network 202 at external targets, e.g., by detecting unusual heavy traffic patterns to or from a given set of IP addresses. When a potential DOS attack is identified, the DDOS detection service 274 may provide inputs to the appropriate NCSs 180 regarding potential network attacks or intrusions, which may lead the NCSs 180 to throttle bandwidth limits or change other networking configuration options at least temporarily for some instance hosts or network devices in an effort to mitigate the effects of the potential attack. An instance placement service 272 may obtain the latest available networking-related metrics and configuration settings from the NCSs 180 to select instance hosts with sufficient spare bandwidth available for launching new instances, or to select instance hosts to which existing instance should be moved in view of changing network traffic conditions.

Classification Metadata Usage at Instance Hosts

As described above, networking configuration servers may transmit representations of traffic classification metadata to instance hosts of various network-accessible services in different embodiments. FIG. 3 illustrates an example of a networking manager module capable of interpreting traffic classification metadata at an instance host 144 of a virtualized computing service, according to at least some embodiments. The instance host 144 may include a virtualization management software stack (VMSS) 310 capable of instantiating and managing a number of different client-accessible virtual machines or compute instances 350, such as compute instances 350A and 350B. The VMSS 310 may comprise, for example, a hypervisor 317 and an administrative instance of an operating system 315, which may be termed a "domain-zero" or "dom0" operating system in some implementations. The dom0 operating system may not be accessible by clients on whose behalf the compute instances 350 run, but may instead be responsible for various administrative or control-plane operations of the virtualized operating system, including handling the network traffic directed to or from the compute instances 350.

In the depicted embodiment, the dom0 operating system 315 may include a variety of control modules including a networking manager component 357 that in turn comprises a classification metadata interpreter module 359. The networking manager component may receive the classification metadata generated by an NCS 180 for instance host 144, for example, including the representations of the classification tree and/or the classification procedure described above. The interpreter 359 may parse the metadata and apply the procedure indicated in the metadata to packets of traffic directed to or from the various compute instances 350. For example, in order to implement bandwidth limits for various traffic categories, one or more instance packet queues (IPQs) 319 (e.g., IPQs 319A and 319B) may be configured. If the incoming or outgoing traffic rate of a particular category at a particular instance 350 exceeds the bandwidth limit for that category during a given time interval, some of the incoming or outgoing packets may be queued in an IPQ 319 for that particular instance. In some implementations, more than one packet queue may be instantiated for a given compute instance, e.g., one packet queue per traffic category may be set up. In other implementations, a single packet queue may suffice for queuing packets associated with multiple instances 350. IPQs or other similar constructs may also be used to implement other networking configuration options in accordance with metadata received from NCSs in various embodiments, such as latency requirements, other quality-of-service goals (e.g., relative priorities of network transmissions for different traffic categories), packet fragmentation settings, or settings dependent upon packet size.

As shown, each compute instance 350 may comprise a corresponding client-accessible operating system 370 in the depicted embodiment, such as OS 370A of compute instance 350A and OS 370B of compute instance 350B. The operating systems 370 may each comprise their own networking stacks 372 (e.g., networking stack 372A of instance 350A and networking stack 372B of instance 350B), which may communicate with the networking manager 357 to use the hardware network interfaces of the instance host 144 for incoming and outgoing traffic. From the perspective of the clients on whose behalf the compute instances 350 are implemented, each instance may appear to be a fully functional server, and the clients may not be aware of the details of the implementation of the networking configuration techniques being used (such as the queuing of packets at the IPQs). It is noted that techniques for interpreting and using classification metadata similar to those illustrated in FIG. 3 may be used for instance hosts of other types of network-accessible virtualization services as well in different embodiments, such as various types of storage services or database services. It is also noted that in some embodiments, the classification metadata may be interpreted and/or used at least in part at the networking stacks 372 of the instances 350, instead of or in addition to at networking manager 357 of VMSS 310.

Metadata Transmission Modes

Figure 4A:
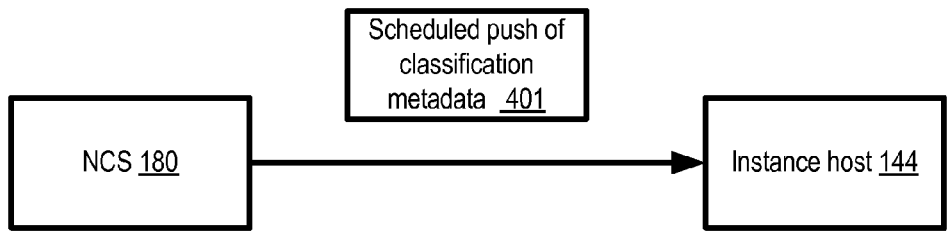
FIG. 4a-4c illustrate respective examples of protocols that may be used to transmit traffic classification metadata to an instance host, according to at least some embodiments.
Figure 4B:
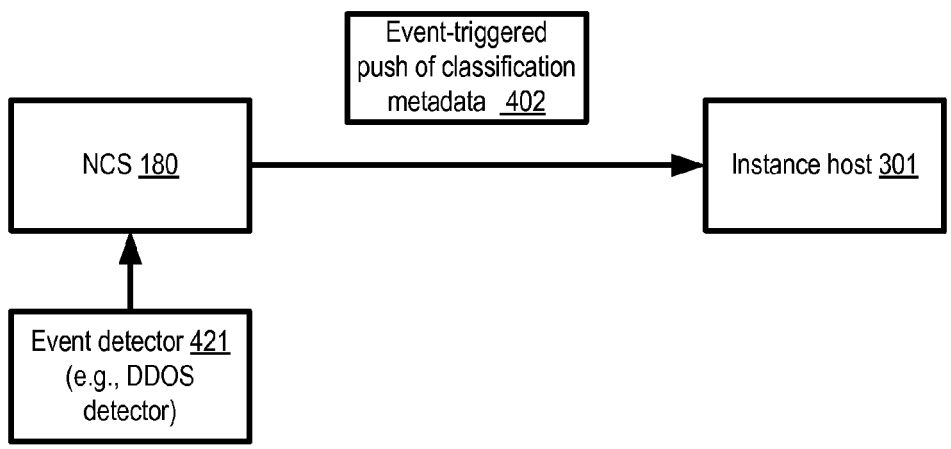
Figure 4C:
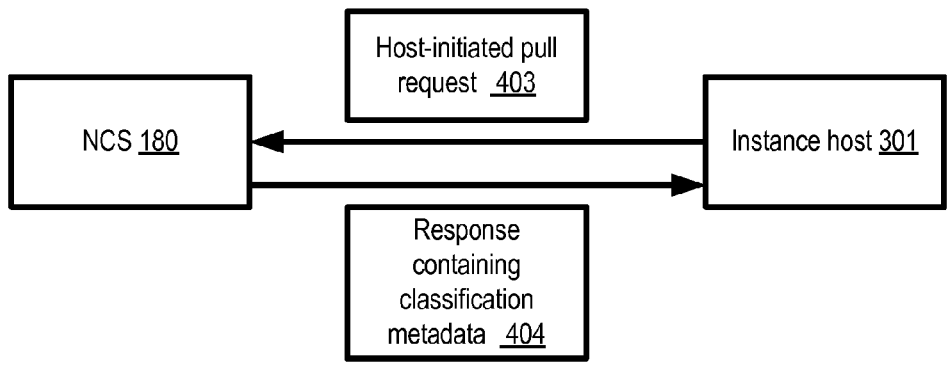

Representations of the metadata generated by the NCSs 180 may be provided to targets such as instance hosts 144 or networking devices 145 in accordance with different protocols or transfer modes in different embodiments. FIG. 4a-4c illustrate respective examples of protocols that may be used to transmit traffic classification metadata to an instance host, according to at least some embodiments. One or more programmatic interfaces may be used to provide the metadata to instance hosts or to other nodes of a distributed system in different embodiments, with either the NCS or the receiver of the metadata invoking the interfaces in accordance with the protocol being used.

In the embodiment shown in FIG. 4a, classification metadata may be sent to instance hosts 144 (or to network devices 145 or storage devices) via scheduled "push" operations 401 initiated by the NCS 180. For example, each NCS may be configured with a respective schedule according to which the NCS is to send metadata to a given metadata target (e.g., once every minute, or once every five minutes). The actual times at which the metadata is sent in some implementations to different targets from a given NCS may be staggered to avoid network congestion caused by the metadata transfer itself. For example, if the metadata is to be pushed once every minute to six instance hosts from a given NCS, the metadata transmission to each of the instance hosts may be scheduled ten seconds apart In the embodiment shown in FIG. 4b, triggering events may lead to metadata being transmitted. For example, an event detector 421 may notify the NCS that an event such as a potential DDOS detection has been detected, and the NCS may then generate appropriate metadata to mitigate effects of the event. For certain types of events, the triggered push 402 of the generated metadata may be initiated at a high priority as soon as the metadata is generated in some embodiments, in an attempt to respond as quickly as possible to the event. For other types of triggering events, e.g., if an administrator submits a request to override previously-generated metadata, the metadata need not be pushed immediately or at a high priority.

In the embodiment depicted in FIG. 4c, the instance host 144 may submit a pull request 403 to the BA 180 for the most recent classification metadata, and the metadata may accordingly be sent to the instance host in the response 404. In various embodiments, combinations of any of the three approaches illustrated in FIG. 4a-4c may be used, either for instance hosts 144, for network devices 145, or for storage devices. In at least one embodiment, a differential approach may be used when transmitting metadata—that is, a representation of only the differences between the current metadata and the most-recently provided metadata may be sent to an instance host, network device or storage device. In other embodiments, the entire metadata may be transmitted in each transfer.

Classification Trees

Figure 5:
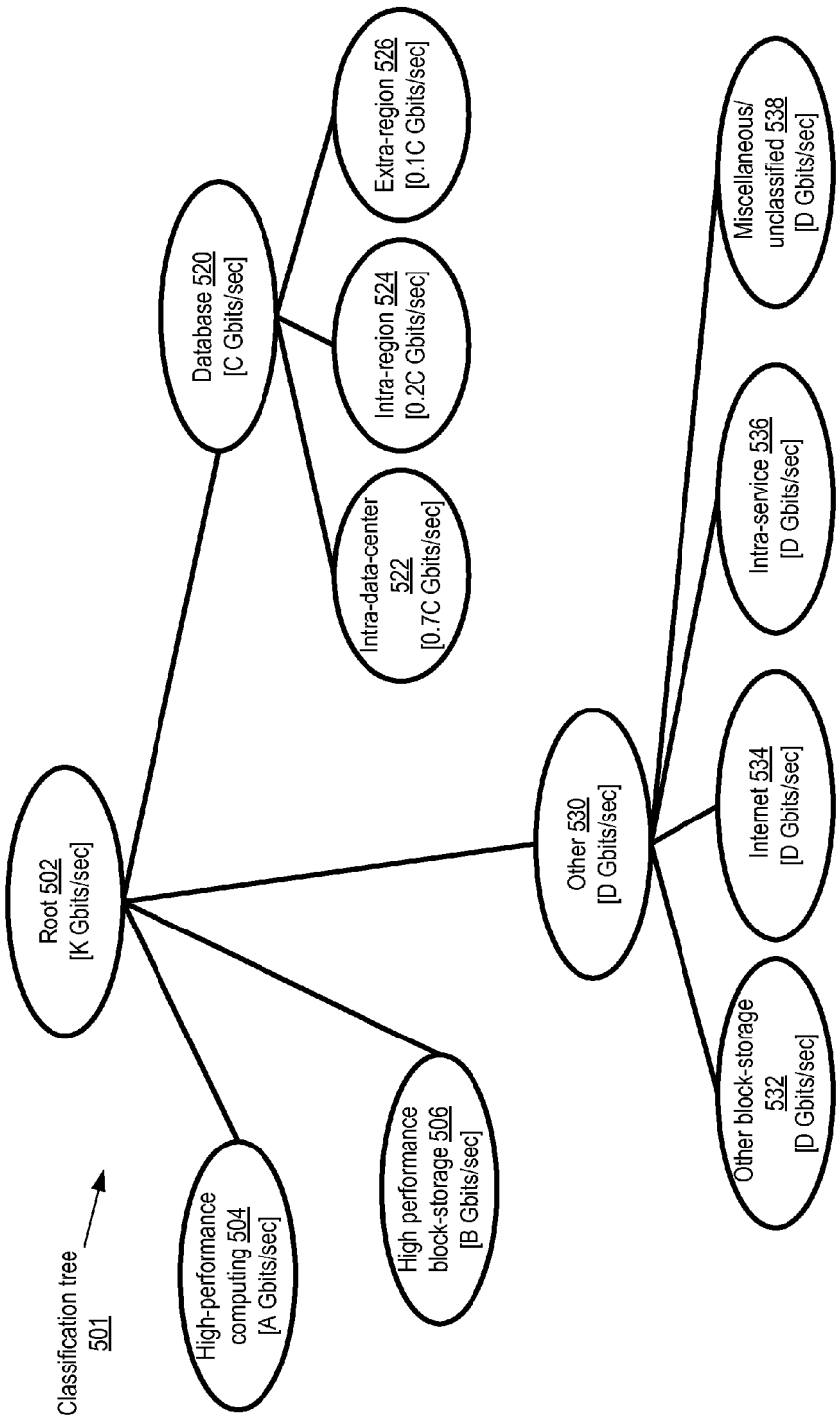
FIG. 5 illustrates an example of a classification tree data structure that may be used to represent network traffic categories for networking configuration at a device of a distributed system, according to at least some embodiments.

FIG. 5 illustrates an example of a classification tree data structure 501 that may be used to represent network traffic categories for networking configuration at a device of a distributed system, according to at least some embodiments. Each node of the tree 501 may have an associated set of networking configuration options or settings, such as the respective bandwidth limit illustrated for each node in FIG. 5, for the category represented by the node. Other examples of networking configuration options that may apply to each node may include packet latency requirements or goals, other quality-of-service goals such as relative prioritization of different traffic categories, packet fragmentation/reassembly settings, or configuration settings dependent upon packet size. Traffic categories may be defined based on differences in a variety of properties in different embodiments—e.g., based on the category of application associated with the traffic, the services whose components are at the sending or receiving end, the network addresses of the endpoints involved (which may themselves be indicative of application type in some cases), the sizes of the transfers, the clients on whose behalf the traffic is generated, the locations of the endpoints relative to each other (e.g., whether, for an outgoing packet from a provider network node, the destination is within the local data center, the local availability container, the local region, another region of the provider network, or external to the provider network) and so on. In the illustrated classification tree 501, for example, node 504 represents traffic for one class of applications (high performance computing), node 520 represents database traffic, and node 506 represents high-performance block storage traffic (i.e., traffic associated with block storage devices that are configured to support high input/output rates). Within the database category represented by node 520, three nodes for location-based sub-categories are defined: node 522 for intra-data-center traffic, node 524 for intra-region traffic, and node 526 for extra-region traffic.

In embodiments in which the networking configuration options defined for various categories include bandwidth limits, traffic summation policies or rules of various kinds may apply to the classification tree, governing the relationships between the bandwidth limits of child nodes relative to parent nodes. In the illustrated example, the following rules may apply: (a) no child node in the tree may have a bandwidth limit exceeding the bandwidth limit of its parent, and (b) although the sum of the bandwidth limits of the children nodes of a parent node may exceed the bandwidth limit of the parent, during any given time period the sum of the actual traffic rates for the categories represented by the children nodes may not exceed the bandwidth limit of the parent.

In accordance with these rules, since the root node (collectively representing all the traffic categories defined for the instance host or network device for which the classification graph is generated) has a bandwidth limit of K Gbit/sec, none of the children nodes of the root node may have a greater bandwidth limit than K Gbit/sec; thus, A<K, B<K, C<K, and D<K. In the case of node 520, the bandwidth limits of the children nodes (nodes 522, 525 and 526) have been assigned to sum up to the bandwidth limit of the parent node, and so both rules stated above are satisfied. In the case of node 530, representing a generic "other" traffic category with a bandwidth limit of D Gbit/sec, the child nodes 532 (other block-storage traffic), 534 (Internet traffic), 536 (Intra-service traffic) and 538 (miscellaneous or unclassified traffic that is not represented by any other leaf node) each also have a bandwidth limit of D Gbit/sec. Such a scenario, in which the sum of the nominal bandwidth limits for children nodes (4D Gbit/sec in this case) exceeds the bandwidth limit of the parent node (D Gbit/sec), may be interpreted as follows in accordance with the second rule listed above. Even though in principle each of the categories of the children nodes can have traffic rates of up to D Gbit/sec, in practice, during any given second (or other appropriate time unit), the sum of the actual traffic flows of all the child nodes is not to exceed D Gbit/sec. Thus, if the traffic rate for the category "other block-storage traffic" (node 532) is 0.6D Gbit/sec during a particular second, the traffic rates for nodes 534, 536 and 538 combined may not be allowed to exceed 0.4D.

Respective trees may be generated by an NCS 180 for incoming and outgoing traffic at a given instance host or network device in some embodiments, and the tree for incoming traffic may differ from the tree for outgoing traffic in the networking configuration options and/or the categories. In some embodiments, for some or all nodes of a classification tree, different limits may be defined for sustained bandwidth (to be applied to average bandwidth usage over time periods exceeding T seconds, for example), and for burst bandwidth (e.g., a short term burst traffic rate of 4 Gbit/sec may be allowed for up to 2 seconds for a given instance host, even though the sustained bandwidth limit for that instance host is set to 1 Gbit/sec). As noted earlier, in some implementations, the traffic classification hierarchy for a given instance host, network device or storage device may be flat instead of comprising multiple layers.

In some scenarios, it may be useful from an administrative perspective to combine the classification trees of different entities of a distributed system into higher-order trees. FIG. 6 illustrates an example of a hierarchical data structure 601 that may be used to combine network traffic category information of a plurality of instance hosts at a data center, according to at least some embodiments. As shown, respective classification trees (C-trees) may be generated for numerous instance hosts at the data center, such as C-trees 601A, 601B, 601M and 601N. The data center may comprise a plurality of server racks arranged in a number of different rooms in the depicted embodiment. An NCS may aggregate the C-trees of the instance hosts incorporated in a given rack, forming rack-level C-trees such as 603A and 603B. At the next level of aggregation, the rack-level C-trees 603 for all the racks in a given room or subset of the data center may be combined, e.g., in the form of room-level C-trees 605A or 605B. A single composite tree 607 may be created for the data center as a whole in some embodiments, by combining the room-level trees. Higher-level tree hierarchies, such as at the level of availability containers, geographical regions, or a provider network as a whole may be constructed in some embodiments.

Such composite tree hierarchies may help the networking configuration system and the administrators of the provider network in a number of ways, especially in implementations in which customizable visual representations of the hierarchies are made available programmatically (e.g., via a unified console service). An overview of the uniformity or non-uniformity of bandwidth usage at different parts of the data center or provider network may be obtained using such hierarchies, which may in turn lead to configuration or placement changes to improve or balance network utilization levels. The distribution of available bandwidth among different categories of traffic may also become clearer when such higher-level hierarchies are examined, which may in turn be helpful in making pricing changes (e.g., an increase in the pricing of traffic related to more popular categories) that help improve the provider network's revenue. Placement services may also benefit from higher-level tree hierarchies, e.g., by determining rack-level bandwidth usage which may help in selecting appropriate instance hosts for new service instances.

Classification Procedure Graphs

As described above, in at least some embodiments a networking configuration server may determine the steps or rules of a procedure that can be used to classify network traffic units such as packets into the categories defined for a given instance host or network device. FIG. 7 illustrates an example of a traffic procedure graph 750 that may be used together with a classification tree to determine the category of a unit of network traffic, according to at least some embodiments. Such a graph 750 may comprise a plurality of decision nodes in each of which a respective set of classification criteria for network traffic are indicated. In at least some embodiments, at least a subset of the decision nodes may be arranged in a sequence in which successive nodes of the sequence correspond to successively narrower categories. For example, in the sequence of nodes 701, 702 and 703, a subset of traffic that matches criteria indicated in node 701 may match the criteria indicated in node 702, and a subset of traffic that matches criteria indicated in node 702 may match criteria indicated in node 703. If a given unit of network traffic ends up not matching the criterion of the last node of the sequence, that traffic unit may have to be evaluated using a different sequence—e.g., if a packet does match the criteria of nodes 701 and 702 (as indicated by "yes" results with respect to nodes 701 and 702) but does not match the criteria indicated in node 703 (as indicated by a "no" result with respect to node 703), the packet may then have to be evaluated using the sequence of nodes 704 and 705.

In general, if a given traffic unit matches all the criteria of a given sequence of nodes, its category may be determined—e.g., it may be classified as a category C1 packet if the criteria of nodes 701, 702 and 703 are met, as a category C6 packet if the criteria of nodes 707 and 708 are met, as a category C5 packet if the criteria of node 706 are met, or as a category C7 packet if the criteria of node 709 are met. The criteria indicated in a given node may be expressed in terms of various properties of the network traffic unit in different embodiments. For example, the contents of one or more headers of a packet, such as the source or destination IP address, port numbers, or the networking protocol being used may be used to determine its category, or contents of the body may be used. Each of the categories into which a given traffic unit may be classified using the procedure may correspond to a corresponding node of a classification tree also generated by the NCS in the depicted embodiment.

At least in principle, arbitrarily fine-grained criteria may be used for packet classification in at least some embodiments, and arbitrarily long sequences of decision nodes may be generated. For example, the classification criteria may be based on very specific contents of the packet bodies (e.g., whether a particular byte range "0xff" occurs at offset O1 of a packet), or on arbitrary combinations of packet or header contents, and so on. In order to reduce the size and complexity of the classification procedure graphs 750, decision nodes with multiple possible outcomes may be used in some embodiments. For example, in procedure graph 750, node 705 comprising lookup table 770 is included. Each such lookup table may comprise a plurality of rows from which one may be indexed or selected on the basis of a property of a given traffic unit (such as a packet's destination IP address) to arrive at a classification decision. In the example of node 705, the classification decision is whether the packet belongs to category C2, C3 or C4. In other cases, the classification decision may be to evaluate the packet using an additional sequence of decision nodes—e.g., the lookup table entries may serve as pointers to other classification graphs or sub-graphs.

Figure 8:
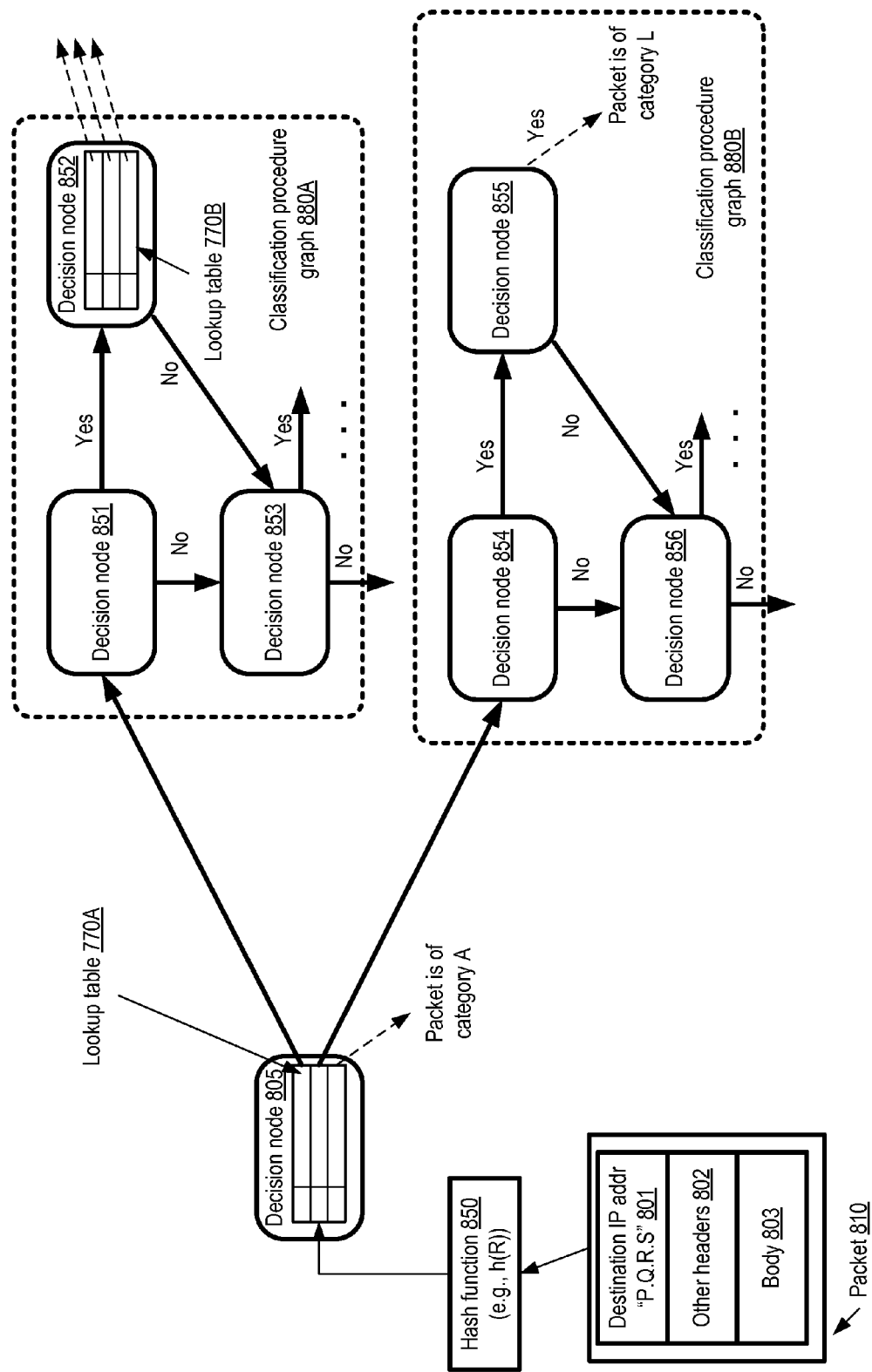
FIG. 8 illustrates an example of a use of a lookup-table node of a traffic classification procedure graph, according to at least some embodiments.

FIG. 8 illustrates an example of a use of a lookup-table node 805 of a traffic classification procedure graph, according to at least some embodiments. In the depicted embodiment, a hash function 850 may be applied to a portion of a network packet 810 to identify the entry of the lookup table 770A of node 805 that is to be used to categorize the packet. The lookup table node 805 may itself have been reached after an evaluation of other decision nodes of the procedure in some cases, i.e., at least some level of categorization may already have been made for packet 810 prior to the application of the hash function 850. The packet in the depicted example is an outbound packet with a destination IP address "P.Q.R.S" 801, and the third element "R" of the four elements of the destination IP address is used as an input to the hash function 850 to determine the lookup table entry corresponding to the packet 810. Any of several properties of a packet 810 may be used as input to such a hash function in various embodiments, including for example values of other parts of the destination IP address or the source IP address, values of other header fields 802, or even contents of the body 803 of the packet. Rules regarding which properties of the packets are to be used to select lookup table entries, and the function (such as hash function 850) to be applied to the properties, may be provided together with the classification metadata by a NCS 180 to a control module at a target device such as an instance host or a network device in some embodiments.

In some cases, a lookup table entry that is selected (e.g., as a result of the hashing of the destination IP address element) may directly indicate a traffic category of the corresponding packet. For example, a selection of one of the elements of the lookup table 770A leads to the category A in FIG. 8. Other entries of the lookup table may themselves serve as pointers to additional procedure graphs, such as graphs 880A and 880B of FIG. 8, whose decision nodes may have to be navigated in order to determine the category of the packet 810. Such additional procedure graphs that are reached as a result of criteria evaluated from a node of a different graph may also be referred to as sub-graphs herein. In the depicted example, criteria indicated by decision nodes 851, 852 (itself a node comprising a lookup table 770B), and/or 853 may need to be evaluated if the hash function 850 leads to one entry of 770A, while criteria indicated by decision nodes 854, 855 and/or 856 may have to be evaluated if the hash function 850 results in a selection of a different entry of lookup table 770A. If procedure graph 880B is reached, and the criteria indicated in elements 854 and 855 are met, for example, the packet 810 may be deemed to belong to traffic category L in the example of FIG. 8. The incorporation of lookup tables 770 into various nodes of classification procedure graphs 750 may allow fairly compact representations of traffic classification logic, even when complex fine-grained logic is used for the classification.

Responsiveness of Networking Configuration System to Triggering Events

Figure 9:
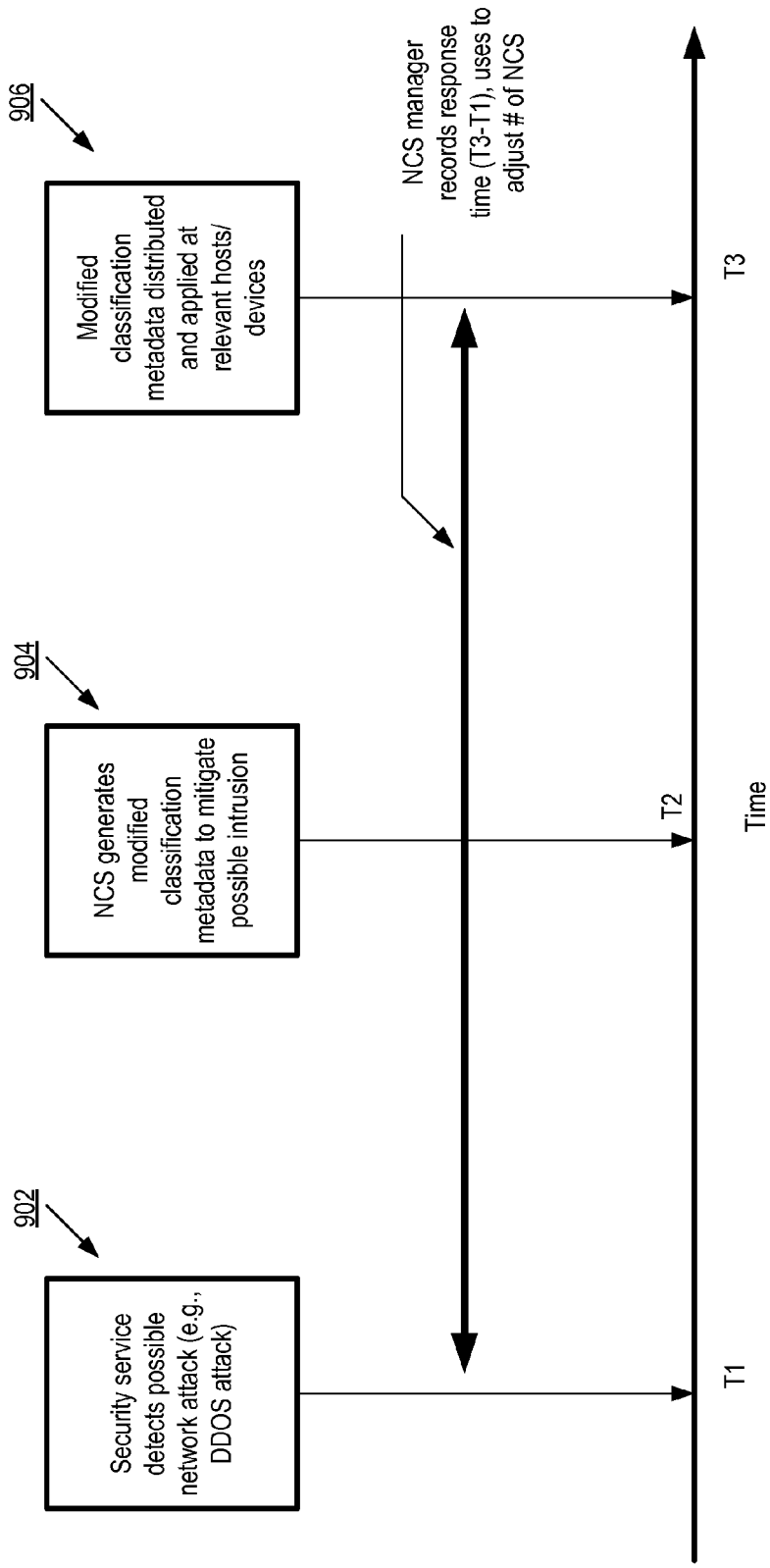
FIG. 9 illustrates an example of a responsiveness metric that may be utilized to determine values for one or more parameters of a networking configuration service, according to at least some embodiments.

In some embodiments, as described earlier, bandwidth management decisions may be made in response to events such as the detection of potentially damaging events, such as network attacks or intrusions. One of the factors that may be taken into account when configuring networking configuration systems, e.g., when deciding how many NCSs should be set up in a particular subset of a distributed system, or what types of computing capabilities and metadata distribution capabilities are required for a networking configuration system, may be the desired responsiveness to such events. FIG. 9 illustrates an example of a responsiveness metric that may be utilized to determine values for one or more parameters of a networking configuration service, according to at least some embodiments.

An example timeline is shown in FIG. 9, in which the time value increases from the left to the right. At time T1, as indicated by block 902, a security service of a distributed system for which centralized networking configuration is being implemented detects a potential network attack, such as a DDOS attack. The possible attack may be identified based on sudden increases in traffic rates directed to or from one or more nodes of the distributed system, for example. Such an attack may be directed at one or more targets within the distributed system (such as a web site of an e-business that is being implemented using a set of compute instances of a provider network), or external to the distributed system (e.g., repeated requests may be sent at high rates from a set of compute instances of a provider network to an external web site). In some cases, the increase in traffic may be for legitimate reasons, such as a sudden burst of interest in a product going on sale at a web site; however, in many embodiments, the security service may employ sophisticated analysis techniques to reduce the probability of such false positives.

Regardless of whether the potential attack is really an attack or not, the networking configuration system may be configured to respond in the depicted embodiment, e.g., by generating new classification metadata and/or new configuration options such as bandwidth limits for the appropriate nodes of the distributed system, and applying the new metadata as quickly as possible. As indicated by block 904, modified metadata for a set of nodes may be generated at time T2 in the depicted timeline. For example, if traffic that may represent an outbound DDOS attack originating from an IP address K.L.M.N and directed at an IP address E.F.G.H is detected, the NCSs responsible for applying bandwidth limits for those IP addresses may generate the new metadata. The new metadata may, for example, simply impose new bandwidth limits (at least temporarily) on all traffic emanating from K.L.M.N or received at E.F.G.H. Alternatively, one or more new traffic categories may be defined, specifically for traffic flowing from K.L.M.N to E.F.G.H, and bandwidth limits for those specific categories may be generated and disseminated.

The modified classification metadata may be distributed to the appropriate instance hosts or other nodes, and may be put into effect at time T3 in the example timeline of FIG. 9, as indicated by block 906. (At some later time, the classification metadata may be modified again, e.g., if the network attack is ended or if the traffic that appeared to indicate the attack was found to be legitimate.) The responsiveness of the networking configuration service to such triggering events, as indicated for example by the interval (T3-T1), may be tracked over time, e.g., by the networking configuration service manager 222, and may be used to adjust the number of NCSs employed, or various properties of the metadata distribution system.

Methods Implementing a Centralized Networking Configuration Service

Figure 10:
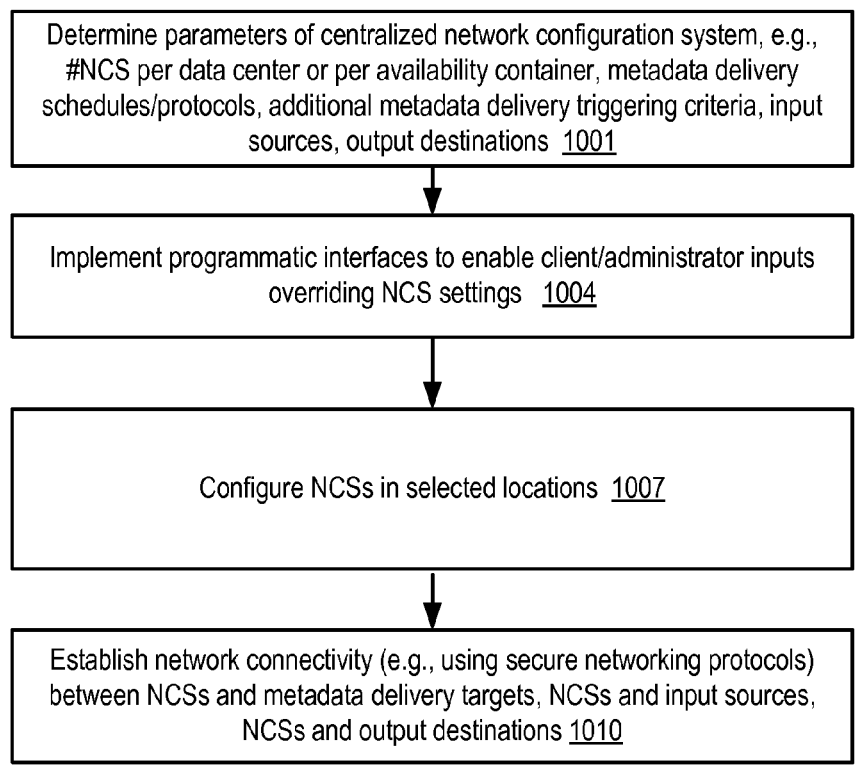
FIG. 10 is a flow diagram illustrating aspects of operations that may be performed to configure and initialize components of a networking configuration service, according to at least some embodiments.

FIG. 10 is a flow diagram illustrating aspects of operations that may be performed to configure and initialize components of a networking configuration service, according to at least some embodiments. As shown in element 1001, various initial or default parameters of the service may be determined, e.g., in view of global bandwidth management policies, availability and/or performance requirements of the service for which the networking configuration is being implemented. Such parameters may include, for example, the number of NCSs 180 to be configured in each availability container or in each data center, the metadata delivery schedules and protocols (e.g., whether a push protocol in which the NCSs initiate metadata transfer is to be used as the default, or whether a pull protocol is to be used in which instance hosts request classification metadata as needed), the types of additional triggering events that may lead to metadata transfer, the input sources to the NCSs and/or the output destinations to which results of the NCS decisions are to be supplied.

In at least some embodiments, a set of programmatic interfaces may be implemented (element 1004), enabling clients and/or administrators to selectively override the decisions of the NCSs. For example, in one embodiments, some clients may be allowed to submit requests to increase various bandwidth limits above those selected by the NCSs (e.g., based on forecast increases in application workload levels), or to submit requests to cap bandwidth limits for certain categories of traffic below those that the NCSs may determine (e.g., in an effort to reduce traffic-related billing costs). Configuration requests from clients/and or administrators for various other types of options may also be supported, such as for latency-related settings, quality-of-service settings, and so on.

The appropriate number of NCSs 180 may be instantiated at selected locations (element 1007) in accordance with the parameters determined in operations corresponding to element 1001. Network connectivity may be established between the NCSs and various other elements of the distributed system or provider network (element 1010)—e.g., between the NCSs and the instance hosts 144 and other network devices 145 at which the decisions made by the NCSs are to be put into effect, between the NCSs and the input data sources influencing the NCS decisions, and between the NCSs and any output destinations that are interested in obtaining networking information from the NCSs on an ongoing basis. In at least some embodiments, secure networking protocols such as TLS (Transport Layer Security), SSL (Secure Sockets Layer) may be used for the network connections between the NCSs and at least some of the other elements of the distributed system.

Figure 11:
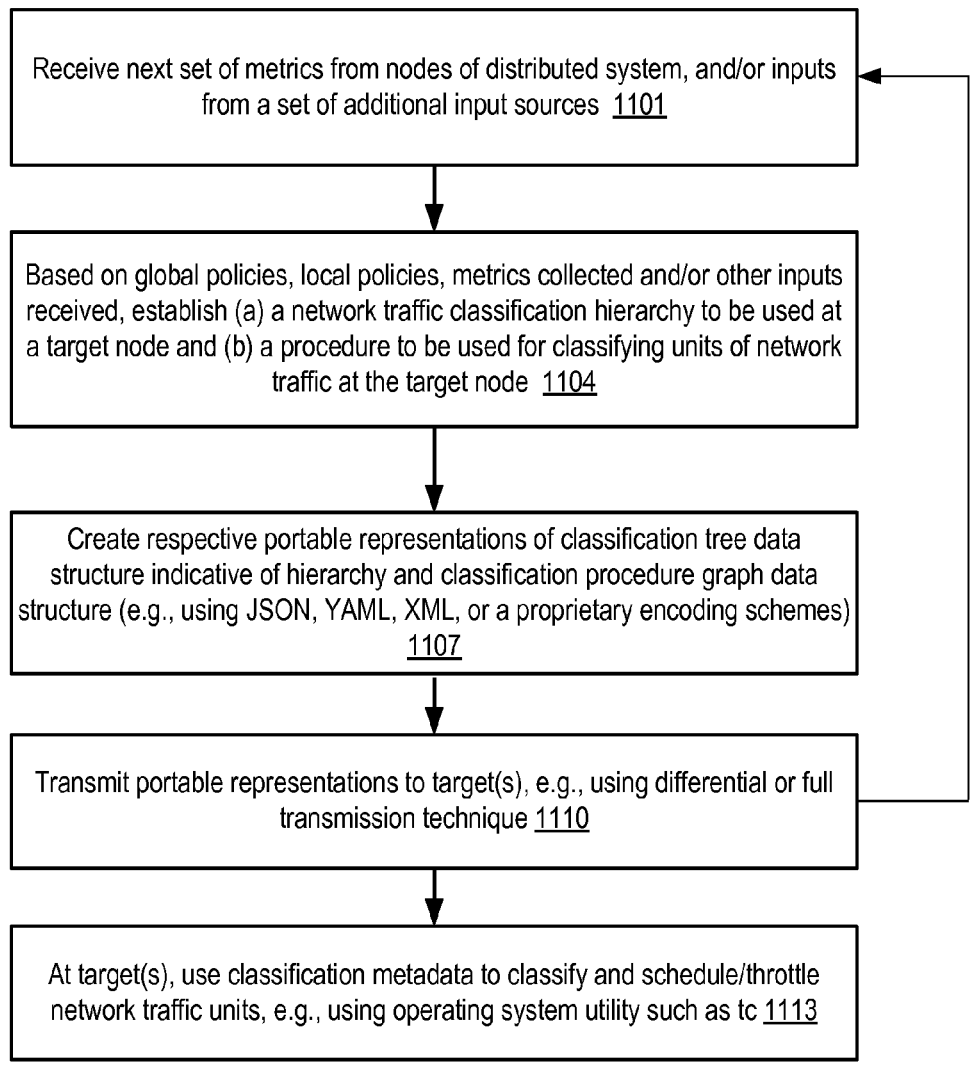
FIG. 11 is a flow diagram illustrating aspects of operations that may be performed to generate and distribute traffic classification metadata of a networking configuration service, according to at least some embodiments.

FIG. 11 is a flow diagram illustrating aspects of operations that may be performed to generate and distribute traffic classification metadata of a networking configuration service, according to at least some embodiments. In the depicted embodiment, an NCS may employ an iterative approach, in which during each iteration a set of inputs is used to determine networking management parameters that are distributed to and applied at a set of target nodes (e.g., instance hosts), and metrics are then collected from the target nodes and other sources to be fed back as inputs to influence or determine the parameters for the next iteration. As shown in element 1101, a given NCS may receive, during a given time interval, a set of network-related metrics obtained from various nodes of the distributed system such as instance hosts and/or networking devices such as switches, routers, gateways and the like. Such metrics, which may for example include measured incoming and outgoing traffic rates, packet loss rates, packet throttling rates, and so on, may be used to generate the next iteration of traffic classification metadata by the NCS. In some cases the metrics may be provided to the NCS via the nodes of a metrics collection system, such as nodes of a health monitoring service, for example. In addition, the NCS may also obtain various inputs from other input sources in the depicted embodiment, including security-related services, per-IP-address traffic aggregators, per-client traffic aggregators, and the like. Clients and/or administrators may also submit configuration requests to the NCS, such as requests to increase or decrease the bandwidth limits previously applied to one or more traffic categories by the NCS, and such configuration requests may also be used as input when determining the next iteration of traffic classification metadata.

At the NCS, the metrics and received inputs may be used to determine traffic classification metadata in the depicted embodiment (element 1104), e.g., in view of global and/or local networking management policies. Global policies may indicate, for example, target utilization limits of various parts of the networking infrastructure, fairness requirements for dealing with traffic from different clients that have signed up for similar levels of service, relative priorities to be given to network traffic for different network-accessible services being implemented, and so on. Local policies may indicate rules that apply at a given availability container or at a given data center whose networking infrastructure and capabilities may differ from those of other availability containers or data centers, for example. The classification metadata generated for a given target node of the distributed system may include a traffic classification hierarchy to be used at the target node (e.g., a hierarchy that can be represented in a tree data structure similar to that shown in FIG. 5), and a procedure or a set of rules to be used to classify units of network traffic into the categories defined in the hierarchy (e.g., a procedure representable using a graph similar to that shown in FIG. 7). For each traffic category defined in the hierarchy, one or more corresponding networking configuration options such as bandwidth limits may also be determined, such as a bandwidth limit defined for the average traffic and a different bandwidth limit defined for short-term bursts, latency requirements, packet-size dependent requirements, or priority settings. In some cases, respective sets of categories and/or options may be defined for incoming and outgoing traffic. At least in some embodiments, the classification hierarchies and/or the procedures may be customized for different instance hosts and/or network devices—e.g., a given host H1 that is being used for one set of client applications may have different traffic categories defined and different bandwidth limits imposed on those categories than another host H2 at which a different set of client applications is being implemented.

Respective portable representations or encodings of the traffic classification hierarchy and the classification procedure may be generated at the NCS in the depicted embodiment for transmission to the target nodes (element 1107). An industry standard protocol or language such as JSON, XML, YAML, or the like may be used in some implementations, while a proprietary encoding scheme may be used in other implementations. The portable representations may be transmitted to the targets where the metadata is to be applied or used (element 1110). In at least one implementation, a single or combined encoding may be used for both the classification categories and the procedure, while in other implementations, respective separate representations of the classification categories and the procedures may be used. In some embodiments, a differential metadata transmission technique may be used, in which for example only that portion of the metadata which has changed since the previous iteration is sent to the target. In other embodiments, a full transmission approach may be used, in which the entire metadata may be transmitted in each iteration. In various embodiments, combinations of scheduled push transmissions (in which the metadata is pushed at the initiative of the NCS to the targets), pull transmissions (in which the NCS transmits the classification metadata in response to a request from the target) and event-triggered metadata transmissions (in which the detection of certain types of events leads the NCS to generate and/or transmit the metadata) may be used. After the metadata for a given iteration has been sent to the appropriate target(s), the NCS may begin its next iteration, e.g., by repeating operations corresponding to elements 1101 onwards.

At the target nodes of the distributed system, control modules (such as the networking manager 357 shown in FIG. 3) may be configured receive and interpret the metadata representations. The metadata may be used to classify units of network traffic such as packets, and to apply the corresponding bandwidth limits to schedule and/or throttle the transmissions of the traffic units (element 1113). In some implementations, operating system utilities or tools such as "tc" that are already available on the node may be used to implement the logic generated by the NCS. In other implementations, custom tools or utilities may be used. Metrics may be collected from the target nodes, e.g., using various performance tools and the like, and used as inputs to the NCS.

Figure 12:
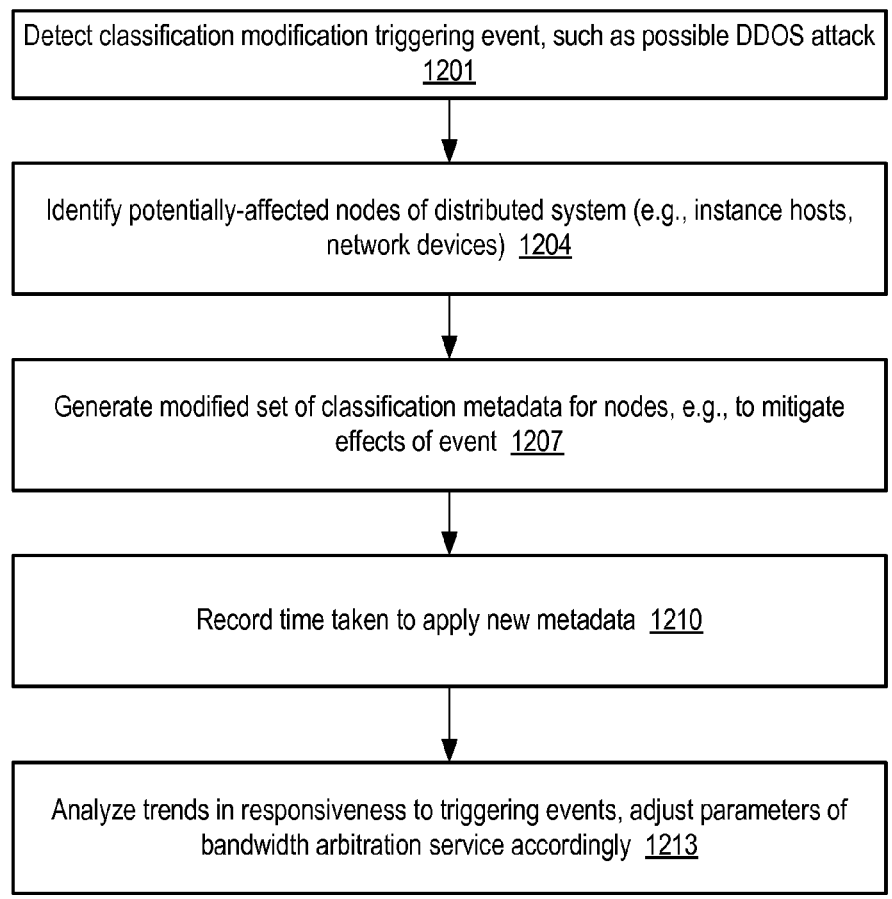
FIG. 12 is a flow diagram illustrating aspects of operations that may be performed to change networking management parameters in response to triggering events, according to at least some embodiments.

FIG. 12 is a flow diagram illustrating aspects of operations that may be performed to change networking management parameters in response to triggering events, according to at least some embodiments. As shown in element 1201, an event that may result in a modification to traffic classification metadata, such as a potential DDOS attack, may be detected. In some embodiments, a provider network may establish one or more security services to identify suspicious traffic patterns that indicate possible attacks of various kinds, and such a service may communicate with the networking configuration system. The specific nodes of the distributed system (e.g., instance hosts and/or network devices such as switches, routers and the like) that may be affected by, or may be contributing to, the attack may be identified (element 1204) in the depicted embodiment, e.g., either by such a security service, by the NCS, or by a combination of the security service and the NCS.

A modified set of traffic classification metadata may be generated at the NCS to mitigate the effects of the attack (element 1207). The modifications may include, for example, new categories of traffic being defined (e.g., based on the addresses of the specific nodes involved in sending and/or receiving the suspect traffic), and/or new bandwidth limits or other networking configuration options to be applied. The new metadata may then be transmitted to a selected set of nodes of the distributed system, which may include the specific nodes involved in or targeted by the attack and/or other nodes (e.g., network devices that are intermediaries along the path taken by the suspect traffic) in some embodiments.

The time taken to respond to the triggering condition, e.g., the interval between the detection of the condition and the application of the new metadata, may be measured and recorded (element 1210). Over time, trends in the responsiveness of the networking configuration system to such triggering events, and/or the effectiveness of the actions taken by the networking configuration system, may be analyzed to determine whether configuration changes need to be made (element 1213). If the responsiveness is found to be inadequate, for example, any of a number of configuration changes may be made: e.g., the number of NCSs may be increased, the connectivity between the event detectors and the NCSs may be improved, the metadata distribution system may be enhanced, and/or the logic at the NCSs or the target nodes may be modified to respond more effectively to detected events.

Figure 13:
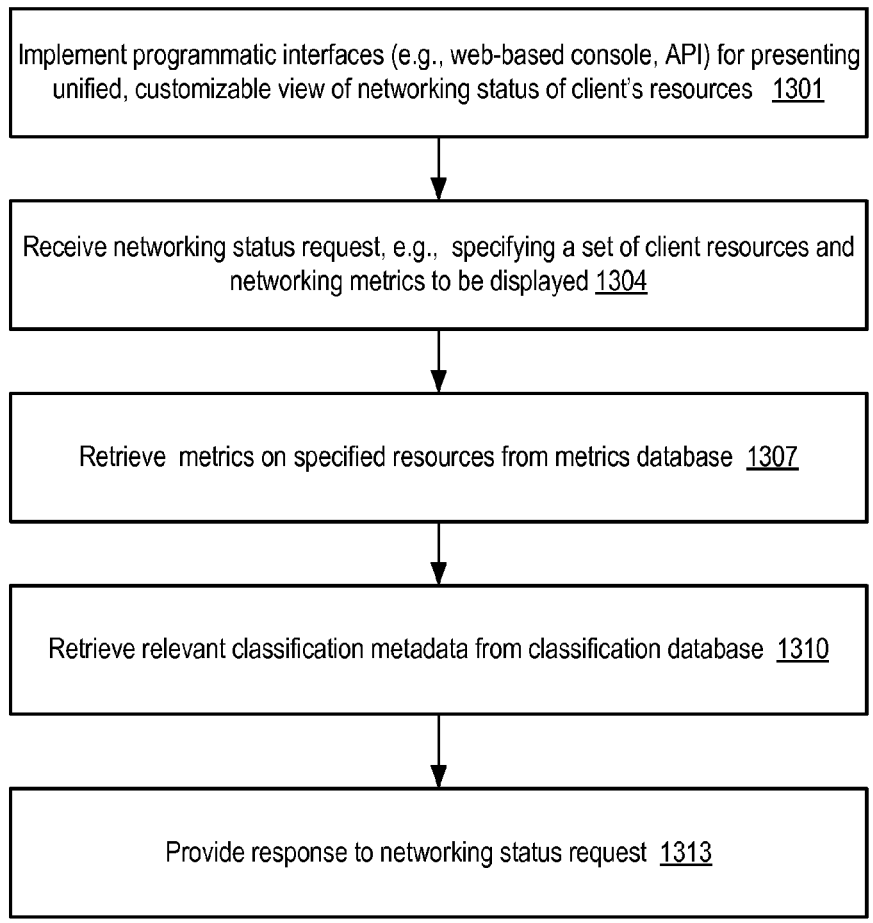
FIG. 13 is a flow diagram illustrating aspects of operations that may be performed to provide a unified view of networking-related status information to a client of a distributed system, according to at least some embodiments.

FIG. 13 is a flow diagram illustrating aspects of operations that may be performed to provide a unified view of networking-related status information to a client of a distributed system, according to at least some embodiments. As shown in element 1301, one or more programmatic interfaces (such as web pages or consoles, APIs, GUIs or command-line tools) may be established for providing unified and customizable views of the networking status of various distributed system resources of interest to a client. For example, a client may have a large number of compute instances of a virtualized computing service assigned, and may wish to see which specific instances have been affected by bandwidth throttling in the last fifteen minutes. The programmatic interface(s) may enable the client to use various filters to specify the networking properties to be displayed and/or the set of resources for which the properties are to be displayed.

A networking status request may be received via such an interface, indicating the metrics and resources of interest (element 1304). The networking configuration system may retrieve the requested metrics, e.g., from a metrics database 190 (element 1307) or from a cache at a NCS. In some embodiments, the applicable classification metadata that may be useful in responding to the request may also be retrieved from a classification database 192 (element 1310) or from a metadata cache at a NCS. Using the collected information, a response to the networking status request may be generated and provided to the requester via the programmatic interface (element 1313).

Resource Usage Visualization Tools for Network Topologies

As described above, the networking configuration service may collect a variety of metrics from various components of a distributed system such as a provider network, and use such metrics to determine settings such as bandwidth limits for at least some nodes. In at least one embodiment, one or more visualization tools capable of displaying performance indicators or resource usage indicators (such as color-coded representations or heat maps of the ratios between the respective measured network traffic rate at various nodes and the respective bandwidth limits set for those nodes) may be implemented. According to one embodiment, a network topology visualization server configured to provide such resource heat maps and/or other types of visualizations may be implemented as a subcomponent of a networking configuration server 180. In other embodiments, such a network topology visualization tool may be implemented independently of the networking configuration server 180, e.g., as another centralized service of the distributed system, or as a standalone entity, and may interact with an NCS 180 or consume data collected by an NCS 180. In at least some implementations, a consolidated networking view generator 152 (shown in FIG. 1) may include a topology visualization interface as one of its features.

A centralized topology visualization server (TVS) may be configured to determine logical and/or physical relationships between various nodes of a distributed system in at least some embodiments. For example, in an embodiment in which a virtual computing service is implemented, the TVS may determine the client accounts to which various compute instances at a set of instance hosts are assigned, and may use the account information to generate a topology that includes only those compute instances that are assigned to a particular client account, or to a selected set of client accounts. In response to a visualization request from a client affiliated with that client account (or set of accounts), a heat map showing performance indicators for the instances of that topology may then be provided. For an administrator of network-accessible service being implemented at one or more data centers, a more detailed topology may be generated, which may indicate the physical or logical network links between various instances, hosts and/or network devices such as switches, routers and the like, and a corresponding heat map may be generated using information that would not typically be made accessible to a non-administrative client of the service. In each case, using the heat map generated, the client or administrator may be provided an easy-to-understand visual representation of various types of resource usage statistics. The usage statistics may then be used, for example, to proactively identify potential bottlenecks or other types of problems and take responsive actions. The range of colors displayed in the heat map, and the transition boundaries between colors, may be selectable to indicate the level of the metric being indicated. For example, in one implementation, a red color may be displayed for a given node of a network topology to indicate that the recently measured traffic rate is very close to the bandwidth limit for that node, while a green color may be used to indicate that the measured traffic is well below the limit, and transitional colors from red to green may be used for intermediate levels of traffic.

According to some embodiments, the a TVS may thus be responsible for obtaining metrics collection from a variety of sources in the distributed system, obtaining relationship information for various components of the distributed system, and determining performance indicators (such as individual performance metrics, or ratios of metrics to applicable limits) for the various types of network topologies based on the metrics and the relationship information collected. Programmatic visualization interfaces enabling clients or administrators to request customized or filtered visualizations of resource performance indicators may be implemented, and the TVS may respond to visualization requests by synthesizing heat maps and/or other graphical representations of the performance indicators using appropriate subsets of the data set. In some implementations, one or more of these tasks may involve interactions with other components or services of a distributed system, as described below in further detail.

Figure 14:
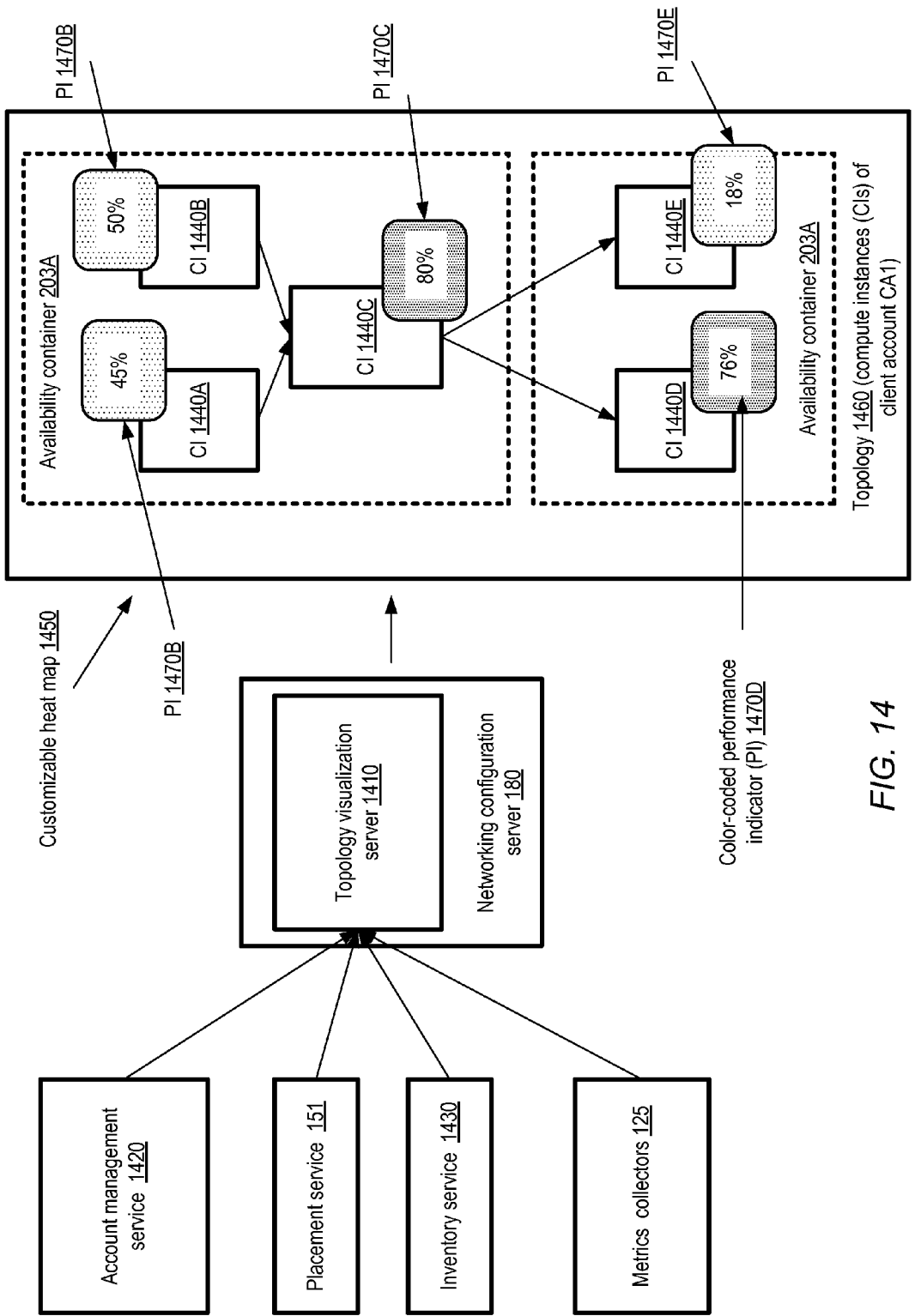
FIG. 14 illustrates an example of a customizable heat map that may be generated by a topology visualization server for at least a subset of the nodes of a distributed system, according to at least some embodiments.

FIG. 14 illustrates an example of a customizable heat map 1450 that may be generated by a topology visualization server (TVS) 1410 for at least a subset of the nodes of a distributed system, according to at least some embodiments. In the depicted embodiment, the TVS is implemented as a constituent element of a networking configuration server 180. In other embodiments, a TVS 1410 may be implemented using one or more hardware or software components independent of, or external to, an NCS; e.g., a centralized visualization service may be implemented in the absence of an NCS in some such embodiments. TVS 1410 may obtain input from several types of data sources in the embodiment shown in FIG. 14, including an account management service 1420, a placement service 151, an inventory service 1430, as well as metrics collectors 125.

Account management service 1420 may provide information to TVS 1410 regarding the client accounts (and/or affiliated user or group accounts) to which various service instances of one or more multi-tenant or single-tenant service instances (e.g., a virtualized computing service, a storage service, or a database service) are assigned. Placement service 151, as described earlier, may be responsible for identifying the instance hosts at which various service instances are launched, and may thus be able to provide instance-to-host mappings in at least some embodiments that may be helpful in generating network topologies. An inventory service 1430 may manage a database that records where within one or more data centers, various instance hosts, switches, routers, and other equipment components of the distributed system are physically located. Metrics collectors 125, as also described earlier in the context of FIG. 1, may gather networking-related and/or other resource metrics from various service instances, hosts, networking devices and the like within the distributed system. For example, for networking-related metrics, the sources may include, among others, (a) network interface cards, (b) networking components of virtualization software stacks installed at virtualization hosts, (c) networking components of compute instances, (d) network tap devices, (e) switches, (f) routers, (g) gateways, or (h) load balancers. It is noted that not all the various types of data sources shown in FIG. 14 may be used by TVS 1410 in some embodiments—e.g., a placement service may in some implementations be capable of providing physical location information regarding various nodes, so interactions with an inventory management service may not be required in such implementations.

Data collected from these various sources may be synthesized by the TVS 1410 to generate various customizable heat maps in response to visualization requests, such as the example heat map 1450. Heat map 1450 shows a network topology 1460 comprising five compute instances (CIs) assigned to a client account CA1-CIs 1440A, 1440B and 1440C in availability container 203A, and CIs 1440D and 1440E in availability container 203B. The topologies generated by the TVS 1410 may in some cases span data center boundaries, availability container boundaries (as in FIG. 14), or other organizational or physical boundaries in various embodiments. For each compute instance 1440 in the topology 1460, a respective color-coded performance indicator (PI) 1470 is displayed—e.g., PIs 1470A, 1470B, 1470C, 1470D and 1470E are shown for CIs 1440A, 1440B, 1440C, 1440D and 1440E respectively. The PIs 1470 may indicate various different types of metrics, or ratios associated with metrics, in different embodiments, and the type of performance information encoded may be customizable in at least some implementations. For example, a ratio of a measured traffic rate to a currently-configured bandwidth limit, for incoming and/or outgoing traffic, may be displayed. In such an example scenario, a red PI may indicate that the measured traffic is close to (e.g., over 75% of) the bandwidth limit, a green PI may indicate that the ratio is below 30%, and a yellow PI may indicate that the ratio is between 30% and 75%. In some implementations, a numerical value or a textual message may also be shown for each node (e.g., the ratio value may be displayed as a percentage). A number of different types of performance indicators may be displayed by the TVS in different embodiments, including network bandwidth-related indicators, latency-related indicators (e.g., how close recently-measured latencies are to an upper bound requested for packet latency, or a ratio between measured average packet transfer latency and a target upper bound on latency), CPU utilization levels relative to a threshold, storage device utilization levels, memory utilization levels, and so on. In some embodiments, in addition to instead of ratios being indicated in the heat map (e.g., the ratio of a measured value to some defined threshold), absolute values may be indicated. In at least some implementations, the heat map may be displayed by a client-side component (such as a web browser or a GUI tool) based on information provided by the visualization service. Thus, the visualization service may be responsible in such implementations for obtaining the metrics, determining the topology and the performance indicators, and providing a selected set of data for inclusion in a heat map in some appropriate format to a client-side component. The client-side component may then display the heat map using the data provided by the visualization service. In at least some embodiments, the visualization service may comprise both back-end and front-end components, with the back-end components responsible for the generation of the underlying data that can be presented in the form of heat maps, and the front-end components responsible for the actual display of the heat maps.

According to some embodiments, users of the TVS 1410 may be able to adjust the granularity of the information displayed in the visualizations. For example, in one implementation, with respect to networking-related performance indicators, a client may indicate a preference for any of the following granularities: (a) a port-level granularity (e.g., information at the level of TCP or UDP ports may be preferred), (b) a network-interface level granularity, (c) a virtual machine level granularity, (d) a host-level granularity, (e) a rack-level granularity, (f) a data center room-level granularity, (g) a data-center level granularity, (h) an availability container-level granularity, or (i) a geographical region level granularity. Granularity choices may also be selected for other types of resources or metrics for which performance indicators may be displayed in various embodiments, such as storage related metrics. The TVS 1410 may aggregate metrics collected at the requested granularity to determine the performance indicators to be included in the visualization or display. In addition to customizing the granularity of the displayed networking-related information, in at least one embodiment the display may be customized for various traffic categories. For example, network traffic to or from a given node of a distributed system may be classified based on the endpoint IP addresses (e.g., whether the traffic is flowing between two instances within a provider network, or to a public Internet address outside the provider network), based on the client account to which an endpoint of the traffic is assigned, or based on the application or application type for which the traffic is generated (e.g., a heat map specific to database-related traffic may be requested, or a heat map specific to high-performance computing may be requested). Traffic classifications such as those illustrated in FIG. 5 may be used in some embodiments to filter the information displayed. In at least some implementations, clients of the TVS may programmatically define traffic categories foe which they want performance indicators displayed. For example, a client may designate one set of its assigned compute instances as a source set, and another set of instances or other endpoints (e.g., a particular database instance) as a destination, and may define a traffic category based on the designated sets.

In one embodiment, visualization requests may include a temporal component—e.g., a request may indicate, for a specified type of metric, a time period for which the metrics are to be collected to generate the displayed performance indicators. In some embodiments, clients may be able to request dynamic visualizations, in which for example the variation in the value of a given performance indicator over a specified time period is to be indicated. The authorization capabilities or roles assigned to the visualization requester (e.g., whether the requester has administrative access permissions with respect to a service, or non-administrative access permissions), may also serve as an implicit filter that controls the kind of information that can be displayed in various embodiments. In some embodiments, a centralized visualization service may be usable for viewing resource metrics or performance indicators pertaining to more than one network-accessible service, and a consumer of the visualization may be able to indicate the services for which performance indicators are to be displayed. For example, a given client account of a provider network may use both a relational database service and a non-relational database service implemented by the provider network, and separate heat maps may be generated for respective topologies and related networking performance indicators for the two different types of database services.

Figure 15:
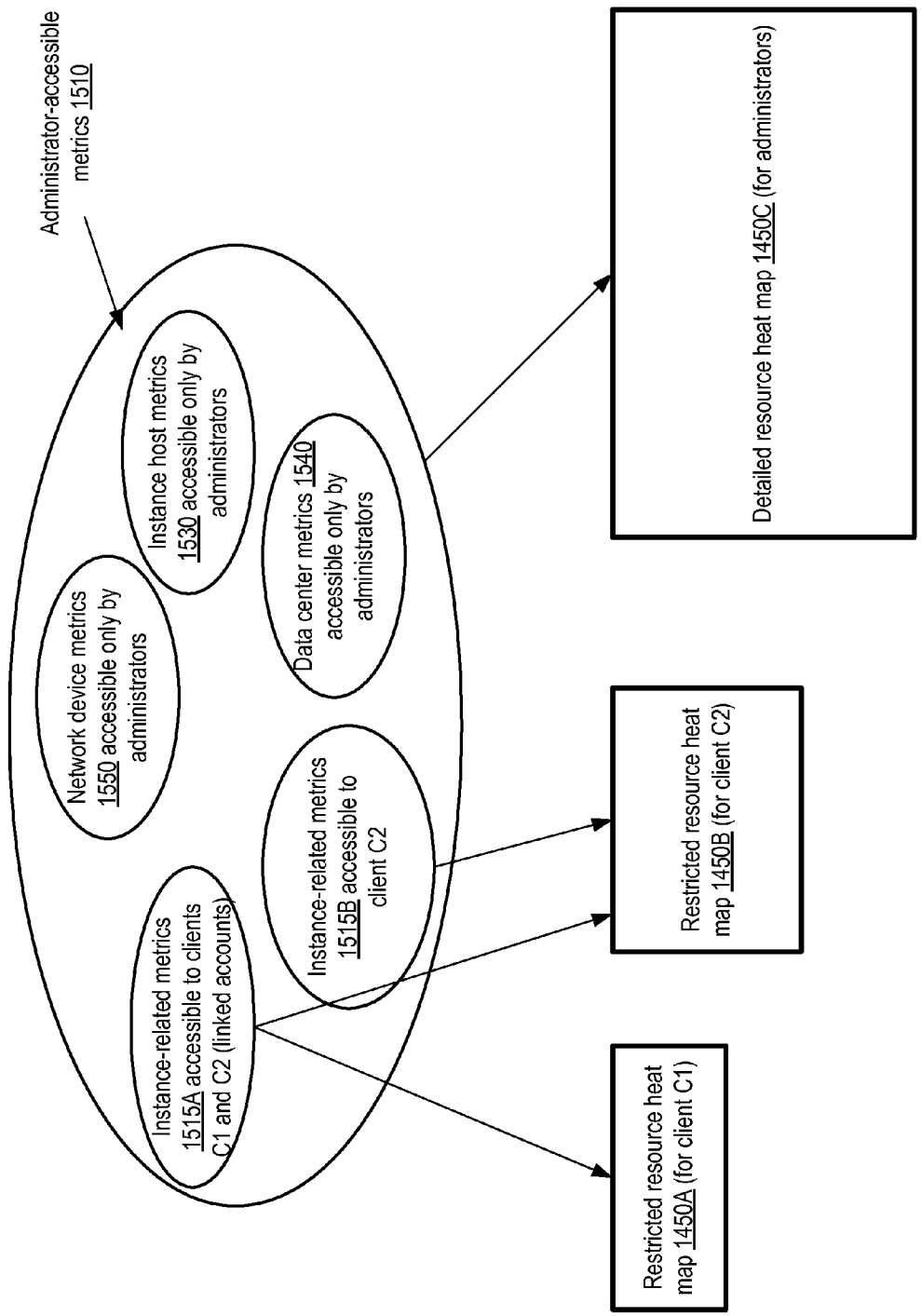
FIG. 15 illustrates examples of different subsets of collected metrics that may be used to generate heat maps for service administrators and non-administrative clients of a service, according to at least some embodiments.

Different consumers of the topology visualization server may be authorized to access different subsets of collected metrics, and hence may be provided visualizations at different levels of detail in some embodiments. FIG. 15 illustrates examples of different subsets of collected metrics that may be used to generate heat maps for service administrators and non-administrative clients of a service, according to at least some embodiments. As shown, the administrator-accessible metrics 1510 may be a super-set of metrics accessible by non-administrative clients in the depicted embodiment. For example, in provider networks in which various virtualized multi-tenant services are implemented, such as a virtual computing service and one or more virtualized storage services, information regarding the physical resources being used to implement the virtualization (e.g., the instance hosts being used, the networking devices being used, the placement of the physical resources within various data centers) may be considered confidential for a number of reasons. Providing details such as the types of hardware processors and devices being used to the service clients may be contrary to one of the main goals of implementing virtualized services: the ability of the clients to seamlessly utilize various service features without having to be concerned about hardware details. However, administrators of the virtualized services may need to know at least some details regarding the hardware being used, e.g., in order to provision the appropriate number and types of hardware servers, racks, networking devices and the like. Accordingly, administrators may be able to view more detailed heat maps generated by a TVS 1410 than are provided to non-administrative clients in the depicted embodiment.

In some embodiments, the types of information exposed to non-administrative clients may include service-instance level performance indicators, such as the ratio of the measured network traffic to bandwidth limits for the instances assigned to a given client account or a set of linked client accounts. A client account may be established in some embodiments at one or more network-accessible services of a provider network on behalf of an organization, such as a private-sector or a public-sector entity, or a department within such an entity. Each client account may encompass a number of different user accounts or group accounts in some implementations. In at least some embodiments, different client accounts may be linked, e.g., for combined billing for two different departments of a large corporation that have each established respective client accounts. Some of the metrics collected by a TVS may be visible only to one client account (e.g., to users/groups defined for that account), such as instance-related metrics 1515B, which are accessible to client C2. Other metrics may be visible to users/groups affiliated with a plurality of linked client accounts, such as instance-related metrics 1515A that are visible to clients C1 and C2.

A number of metric types may not be accessible to non-administrative users in various embodiments. For example, metrics 1550 associated with specific network devices such as switches, routers, gateways and the like may typically not be exposed to non-administrators. Similarly, metrics collected for instance hosts (hardware computing devices that potentially implement service instances for a plurality of clients) may also be accessed only by administrators. In the depicted embodiment, metrics regarding data centers (e.g., the traffic amounts flowing in and out of specific data centers) may also be restricted for administrative use only.

Accordingly, the types of heat maps generated for different consumer categories by the TVS 1410 may differ. Client C 1 may be provided a fairly restricted heat map 1450A derived from metrics 1515A, while client C2 may view heat maps 1450B whose source metrics include both 1515A and 1515B in the depicted embodiment. Administrative users may view heat maps 1450C derived from the larger metrics collection 1510. The decision as to the subset of the metrics to be used to respond to a given visualization request may be made by the TVS at run time in at least some embodiments, e.g., based on a determination of the authorization settings, capabilities or roles of the requester.

Programmatic Interfaces for Visualizations

Figure 16:
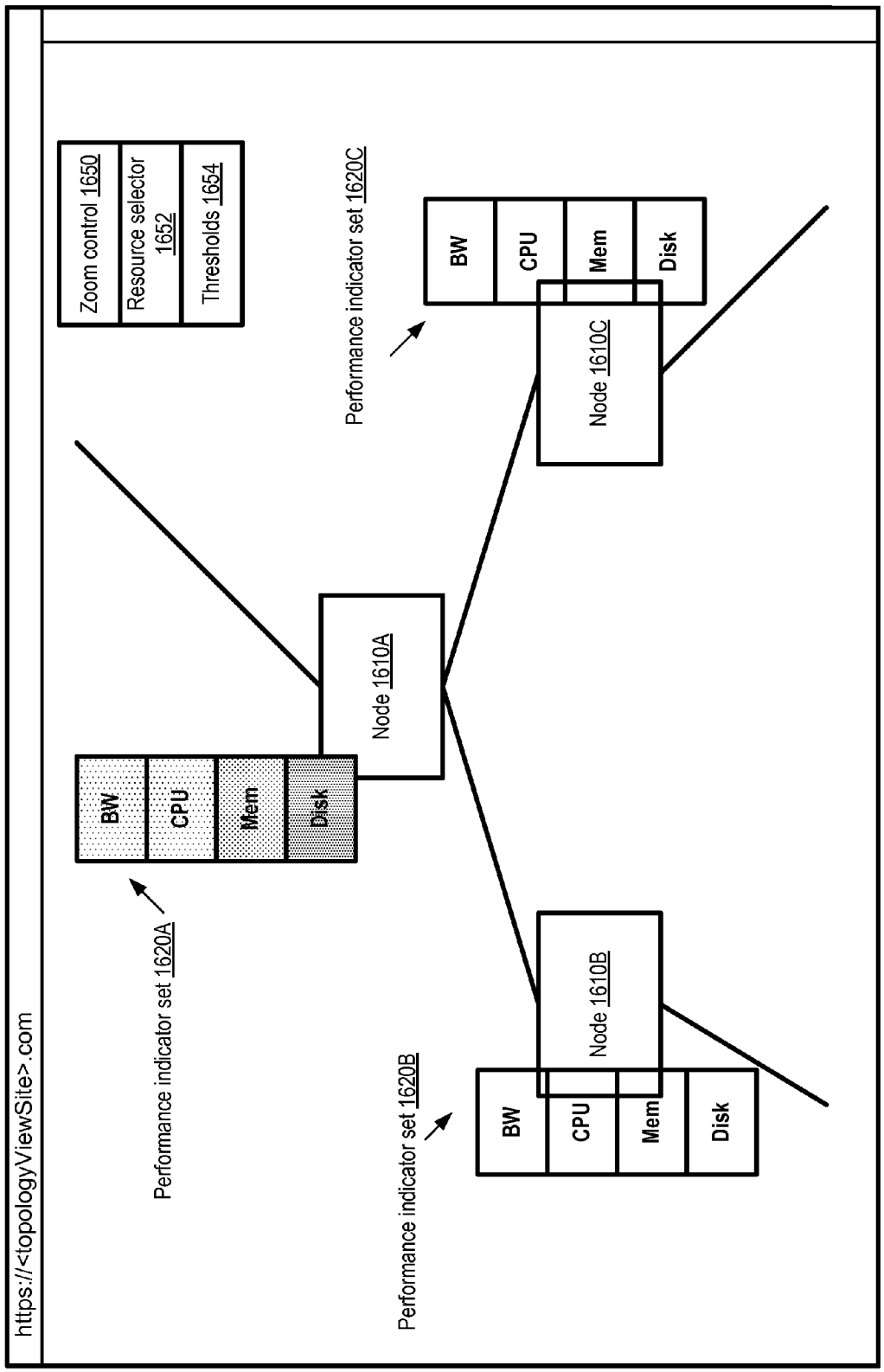
FIG. 16 illustrates an example of a web-based programmatic interface that may be used to display heat maps for network topologies, according to at least some embodiments.

A number of different types of programmatic interfaces may be used to receive and respond to visualization requests in different embodiments. FIG. 16 illustrates an example of a web-based programmatic interface that may be used to display heat maps for network topologies, according to at least some embodiments. As shown, the web-based interface comprises a web page 1602, in which nodes 1610A, 1610B and 1610C of a network topology are displayed together with respective sets of performance indicators 1620A, 1620B and 1620C.

The performance indicators 1620 show color-coded entries for a plurality of resource types for each of the nodes in the depicted example: network bandwidth (denoted by the label "BW" in FIG. 16), CPU, disk, and memory (denoted by the label "Mem"). A number of web-based controls for modifying or customizing the heat map are illustrated in FIG. 16. For example, a zoom control 1650 may be used by the viewer to zoom in or out to different portions of the topology. Resource selector 1652 may be used to filter out some types of resources from the visualization, or to add more resource types. Similar selectors may also be usable to select time periods for the display (i.e., the period of time corresponding to the collection of the metrics use for the performance indicators), network traffic categories, application types, and so on. In the depicted embodiment, the viewer may also be allowed to specify thresholds 1654 to be used for the visualization—e.g., the viewer may indicate that a measured transfer rate of 80% (or higher) of the bandwidth limit should be indicated by a red BW performance indicator, a value less than 30% should be indicated by a green BW performance indicator, and so on.

Figure 17:
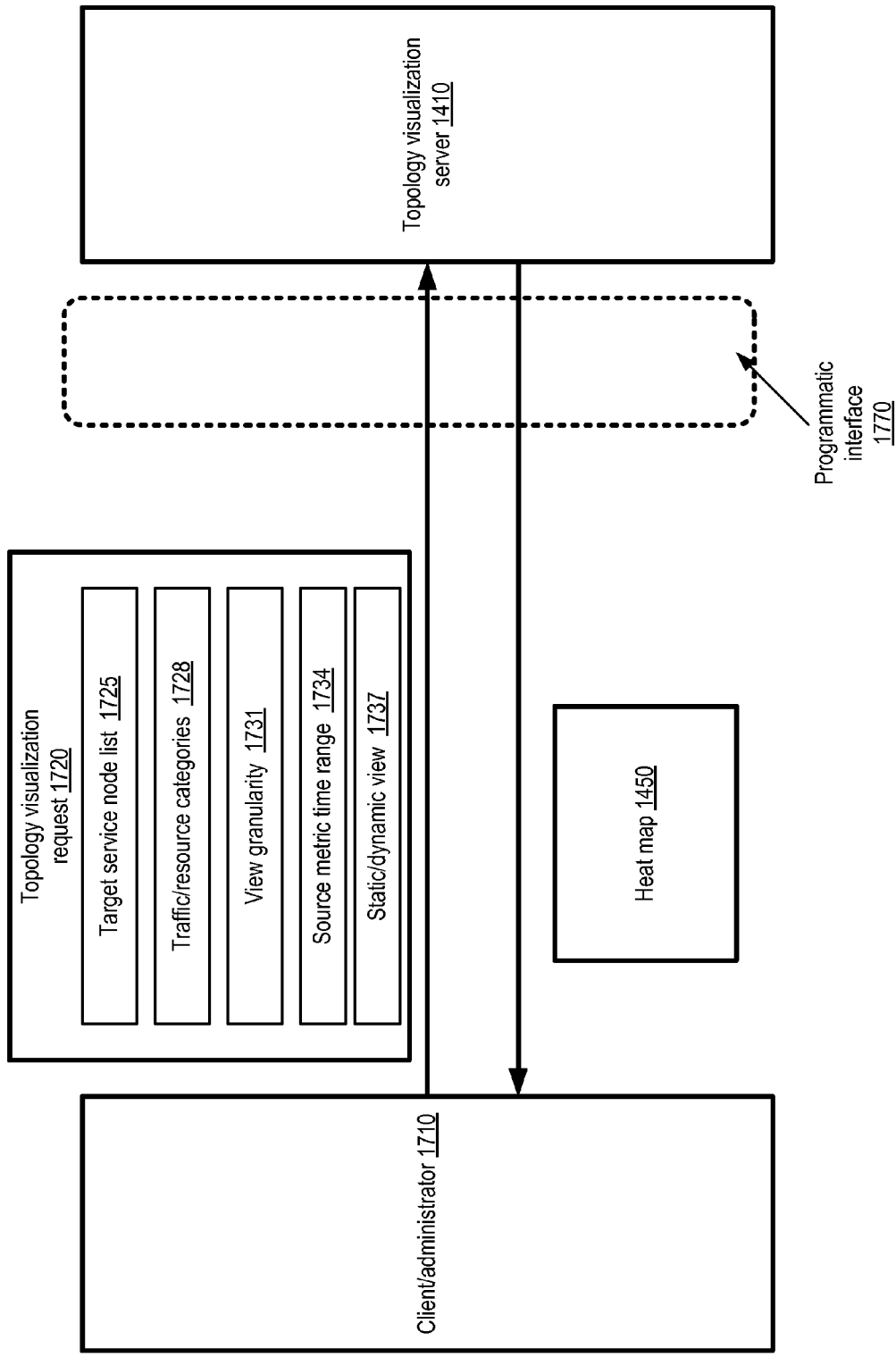
FIG. 17 illustrates example elements of a visualization request that may be received by a topology visualization server via a programmatic interface, according to at least some embodiments.

FIG. 17 illustrates example elements of a visualization request 1720 that may be received by a topology visualization server 1410 via a programmatic interface 1770, according to at least some embodiments. Such a request may be via a web page similar to that shown in FIG. 16 in some embodiments, e.g., in response to a selection of one or more controls similar to controls 1650, 1652 or 1654 by a client or administrator 1710. In other embodiments, such a request may be submitted via a different GUI, an API invocation, or from a command-line tool.

As shown, the request 1720 may comprise a target service node list 1725, indicating the set of service nodes that are to be included in the visualization. In some embodiments, a default setting for the set of service nodes may be used by the TVS 1410 if an indication of a specific set of nodes is not provided by the requester—e.g., by default, all the compute instances assigned to a client account may be selected for visualization, or all the instance hosts within a data center whose administrator issues the request may be considered candidates for inclusion in the visualization. The node set may be indicated explicitly in some embodiments (e.g., by providing a list of node identifiers such as compute instance identifiers), or by indicating filtering criteria that can be used to search for node (e.g., a client may indicate that compute instances in a specified availability container should be included in the set). Categories of network traffic and/or resources to be included in the visualization may also be indicated in the topology visualization request using element 1728. As mentioned earlier, traffic categories may be defined by clients in some embodiments. In other embodiments, a client or administrator 1710 may select from among a plurality of predefined traffic categories instead or in addition to client-defined categories. In some embodiments, different categories of resources may also be selectable—e.g., whether a heat map showing just compute instances should be provided, or whether storage nodes should be included, and so on.

The granularity 1731 of the visualization may also be indicated in the request 1720 in some embodiments—e.g., whether (with respect to network traffic) a host-level view is desired, an instance-level view is desired, and so on. The time range of the metrics collection from various sources to be used for generating the visualization may be indicated via element 1734. In some implementations, a client may be able to request a dynamic visualization—e.g., the change in the value of a performance indicator over a selected time period may be displayed in accordance with a client preference indicated via element 1737. It is noted that at least in some embodiments, the set of choices available with respect to the elements of requests 1720 may vary between users—e.g., administrators may be able to specify a wider range of preferences than non-administrative users of the visualization functionality. In at least one embodiment, administrators may be provided a different set of programmatic interfaces 1770 by the TVS 1410 than is provided to non-administrative users (e.g., a more extensive set of APIs may be available to users with administrative credentials than others). In response to the request 1720, the TVS 1410 may retrieve the appropriate set of data and provide a corresponding display in the form of heat map 1450 in the depicted embodiment.

Methods for Network Topology Visualization

Figure 18:
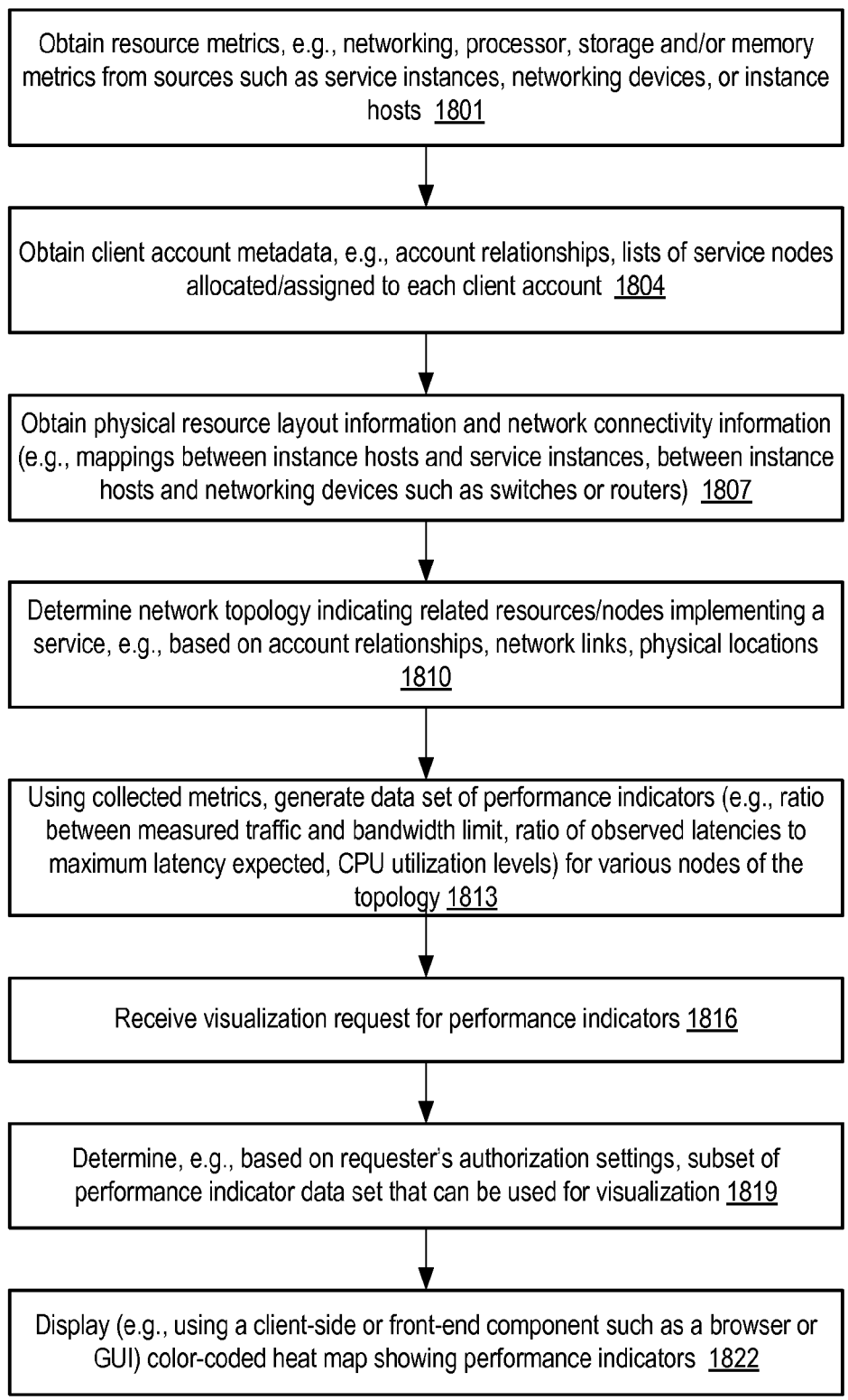
FIG. 18 illustrates aspects of operations that may be performed to generate topology visualizations comprising performance indicators of various nodes of a distributed system, according to at least some embodiments.

FIG. 18 illustrates aspects of operations that may be performed to generate topology visualizations comprising performance indicators of various nodes of a distributed system, according to at least some embodiments. As shown in element 1801, a number of metrics may be collected by a TVS 1410 from a variety of data sources such as service instances of various network-accessible services implemented in a provider network, networking devices such as routers, switches, gateways and the like, as well instance hosts or other types of hardware or software components of a distributed system. The collected metrics may include, for example, networking-related metrics (such as inbound or outbound traffic rates, currently applicable bandwidth limits, measured and targeted latencies, network error counts, packet size distributions, or dropped packet counts), processor-related metrics (such as overall CPU utilizations, target threshold CPU utilization levels, kernel versus user utilization splits, active process/thread counts), memory-related metrics (e.g., amount of free memory available, paging rates, etc.) and storage-related metrics (disk or other storage device utilizations, average response latencies, queue lengths and so on). Metrics regarding currently-applied limits (e.g., bandwidth limits) or performance targets (e.g., latency targets) may be obtained in one embodiment from an NCS 180. In some embodiments, some or all of the metrics may already be collected for other purposes, e.g., to determine bandwidth distribution among various resources by an NCS 180, and the TVS may obtain the metrics from other components of the NCS or from a metrics database 190. In one embodiment, metrics may be piggybacked on other types of messages by various data sources, such as heartbeat messages being sent in accordance with a health monitoring protocol as described earlier.

A TVS 1410 may also obtain client account information (element 1804 of FIG. 18) for various services being implemented in the distributed system, e.g., from an account management service 1420 of a provider network, or from an identity management service. The account information may include the relationships between different client accounts (e.g., some client accounts may be linked to others for consolidated billing), as well as between client accounts and user accounts or group accounts, and so on. In at least some implementations, the TVS may obtain the mappings between service nodes or instances and client accounts, e.g., information indicating the client account on whose behalf a given compute instance was launched. Physical layout information, such as the arrangements of instance hosts in different racks and rooms of a data center, the network links or paths between different nodes of the distributed system and various network devices such as switches and routers may also be obtained (element 1807) in at least some embodiments. The physical layout information may be obtained, for example, from an inventory service or other data center management tools.

One or more network topologies may be determined (element 1810) for related nodes or resources, e.g., synthesizing the account information together with the physical layout information. Depending on the size of the distributed system and its user base, generating and/or storing a comprehensive a network topology may require substantial computing, memory and/or storage resources in some embodiments. Accordingly, several different network topologies may be generated in some embodiments, e.g., one for each data center or one for each geographical region. A data set of performance indicators may be created corresponding to the topology or topologies using the collected metrics (element 1813). Any of a number of performance indicators may be determined or derived for various nodes of the topology, such as the ratio of the traffic rates measured during a recent time interval and the applied bandwidth limits that applied during the interval, the ratio of peak latencies observed during a time interval to target maximum latencies, the CPU utilizations measured relative to targeted maximum or minimum levels, and so on.

A visualization request for at least a subset of the performance indicators may be received (element 1816). The requester's authorization settings may be determined, and the appropriate subset of the performance indicator data set that corresponds to the request and the authorization settings may be obtained (element 1819). A color-coded visualization in the form of a static or dynamic heat map may be displayed (element 1822). A client-side component such as a browser, a browser plug-in, or a GUI, may be used to display the heat map on the basis of data provided by a back-end TVS 1410. In some embodiments, other types of visualizations may also be provided upon request using the TVS 1410, such as histograms of performance indicators, pie charts, and the like. It is noted that in some embodiments, a topology may be generated on demand, e.g., after the visualization request is received and based on the specific types of performance indicators requested.

Client-Requested Resource Usage Limit Reduction

In some distributed systems, the amount that clients have to pay for various services may be dependent on the network traffic generated at service instances on behalf of the clients. In some scenarios, the service may define an upper bound on the amount of data that can be transferred per service instance (or on the rate of data transfer), and charges proportional to traffic may apply below such upper bounds. Clients may therefore have incentives to lower their network usage in such environments, at least temporarily, in order to meet budgets. For some types of services, several different standardized service instance types may be made available to clients, with different networking limits and/or rates applicable to each instance type. FIG. 19 illustrates an example of a set of compute instance types that may be implemented for a network-accessible service, with respective bandwidth limits and respective bandwidth usage pricing policies set for the different instance types, according to at least some embodiments. A table with network-related settings for four different compute instance types 1902 ("small", "medium", "large" and "extra-large" compute instances) defined by a virtual computing service are shown. The instance types may differ in various properties, such as computing power, storage size limits, memory size, or overall pricing, in addition to the differences in networking capabilities and bandwidth-related pricing.

In the depicted embodiment, separate bandwidth limits may be defined for outbound traffic (column 1904) and inbound traffic (column 1908) for each of two different traffic categories (labeled category "A" and "B" respectively). The categories may differ from one another with respect to whether the endpoints involved are within the provider network or not, for example, or whether the traffic is directed to the public Internet or not. In addition to the bandwidth limits for the different instance types, FIG. 19 also shows the outbound and inbound bandwidth pricing (columns 1906 and 1910 respectively), which may also be specified separately for each of the two traffic categories. It is noted that in practice, some prices may be set to zero in some embodiments by a provider network operator—for example, traffic between different compute instances that happen to be instantiated within the same data center may be "free". The information illustrated in FIG. 19 may be accessed by potential clients of the virtual computing service, and may be taken into account by a client (along with other factors, such as computing performance requirements of the client's applications, pricing policies unrelated to bandwidth usage, and so on) when deciding how many instances of each type are to be acquired. Some clients may set aside a budget for networking-related costs using the kinds of information provided in FIG. 19, for example. Depending on the client applications' needs, it may sometimes be the case that a given client needs to utilize much less bandwidth that the maximum supported for their instance types, at least during some time periods, and thus may be able to manage costs more effectively by requesting the imposition of lower limits. For example, in an environment in which a given business organization has numerous individual users who are authorized to access a given network-accessible service, applying a lowered bandwidth limit may be a more reliable way of reducing networking-related costs that simply requesting the individual users to voluntarily control their respective bandwidth usage.

Figure 20:
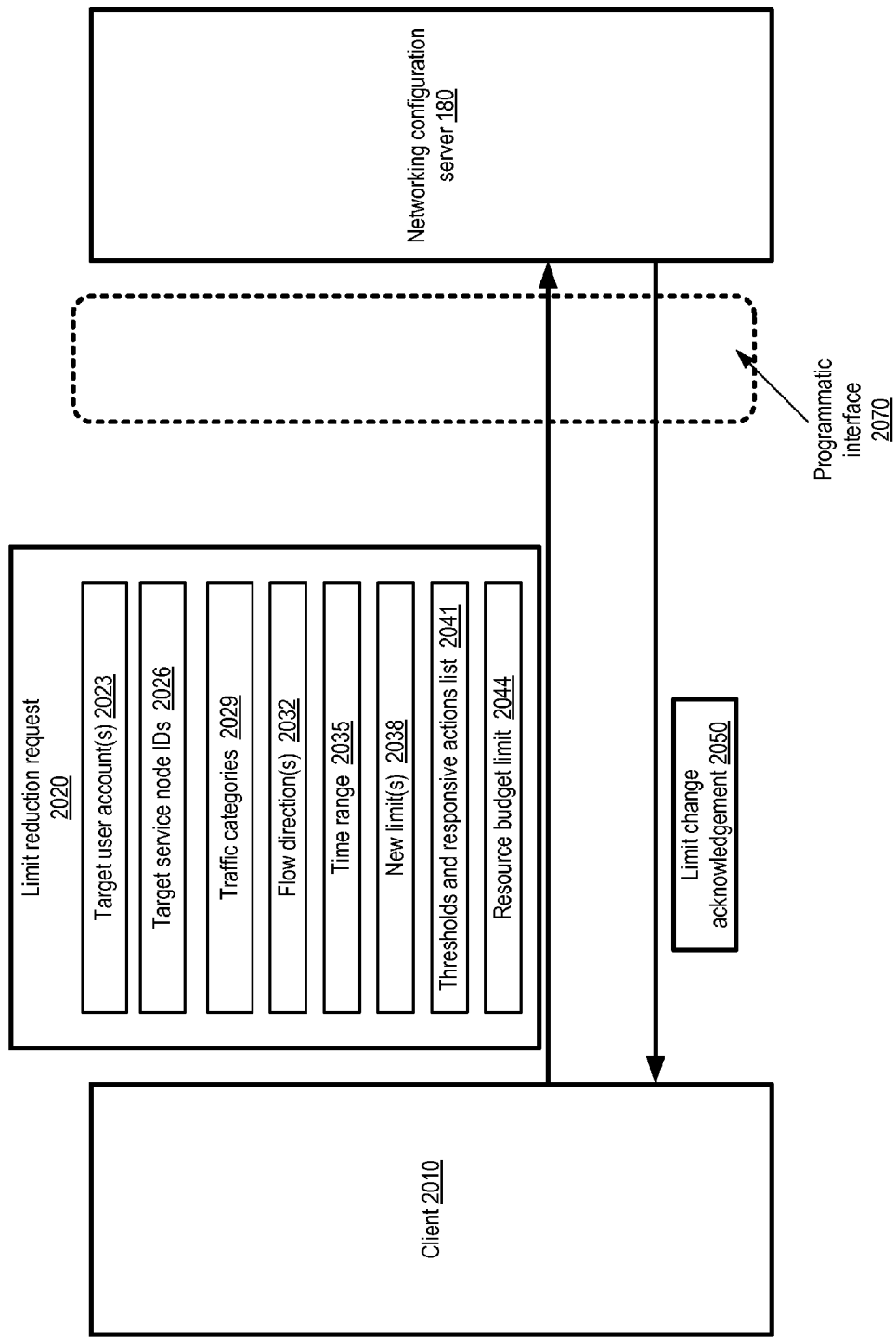
FIG. 20 illustrates example elements of a resource usage limit reduction request that may be received by a networking configuration server, according to at least some embodiments.

In at least some embodiments, a centralized networking configuration service similar to that illustrated in FIG. 1 may be used to implement customer-requested bandwidth limits and/or other types of resource usage reduction limits. Any of several types of networking-related limits may be applied in response to client requests in various embodiments, e.g., (a) an average traffic transmission rate that is not to be exceeded over some period of time, (b) a peak traffic transmission rate that is not to be exceeded even for short periods of time, (c) an upper limit to a total number of bytes of data transferred, or (d) an upper limit on the number of network messages transferred. The periods of time over which the average limit and/or the peak limit are to apply may also be indicated by the clients in some embodiments. FIG. 20 illustrates example elements of a resource usage limit reduction request 2020 that may be received by a networking configuration server 180, according to at least some embodiments. In some embodiments, as mentioned above, a given billable customer account may have several user accounts associated with it, and different resource usage limits may be applied to the different user accounts. As shown, the request 2020 submitted via a programmatic interface 2070 may include an element 2023 indicating one or more user accounts to which the requested reductions are to be applied. Group accounts may also be indicated in some embodiments. In one embodiment, a client 2010 that has several different compute instances or other resources allocated may wish to apply the lower resource usage limits to some subset of those resources. The identifiers of the specific nodes or resources targeted may be indicated via another element 2026 of limit reduction request 2020. A combined resource usage limit for some set of service instances may be requested by the client in some implementations. For example, a client may request that a bandwidth limit of X GB/sec be applied collectively to instances I1, I2 and I3, and the limit may be deemed to have been met if the sum of bandwidth usages of the instances exceeds X GB/sec during a particular time period.

Respective usage limits may be applied to different network traffic categories in some embodiments. As described above, in some embodiments a network-accessible service may define various categories of network traffic, e.g., based on a range of network addresses of the endpoints, based on geographical locations of endpoints, and so on. In some embodiments, for example, respective limits may be applied to (a) traffic flowing over one or more public Internet links (b) traffic flowing within a provider network data center (c) traffic flowing between two provider network data centers within a given geographical region defined by the provider network (d) traffic flowing between two provider network data centers in two different geographical regions defined by the provider network, or (e) traffic flowing between the particular service instance and nodes of a different service implemented at the provider network. In the embodiment shown in FIG. 20, the traffic category or categories targeted for the usage reduction may be indicated via element 2029.

With respect to limits on network traffic, the flow direction (whether the reduced limit is to be applied to inbound traffic, outbound traffic, or both) may be indicated via element 2032. A time range (e.g., a start time, an end time, or both) over which the new limits are to be applied may be indicated via element 2035. The requested limit value (or the extent to which the current limit is to be reduced) may be indicated via element 2038 in the depicted embodiment. For example, element 2038 may indicate that the current bandwidth limit should be reduced by 25%, instead of specifying an absolute value for the new limit. In some implementations, when indicating a new limit, the client may also indicate aspects of the measurement approach to be used—e.g., if a change to an average bandwidth limit is requested, the time periods over which averages are to be computed may be specified, and if a lower peak bandwidth is requested, the time periods over which peak bandwidth is to be quantified may be specified. In at least some embodiments, in addition to specifying the reduced limits, a client 2010 may also define one or more thresholds relative to the limits via element 2041, at which respective actions are to be taken by the network configuration server 180. For example, a client 2010 may wish to be notified when a measured traffic rate in or out of a compute instance exceeds 80% of the client-requested bandwidth limit. In some implementations, the request may include an indication of one or more destinations (e.g., e-mail accounts) to which notifications are to be provided when the thresholds are reached. Several different thresholds with respective actions to be taken may be indicated in some implementations for example, at 80% of a bandwidth limit, a notification may be generated, and at 100%, the service may be permitted to start dropping or discarding packets. Other responsive actions may be taken in some embodiments, either at the client's explicit request or at the initiative of the service, such as queuing some number of packets temporarily instead of transmitting them, or temporarily relaxing/increasing the limits.

In response to receiving request 2020, the NCS 180 may provide an acknowledgement 2050 of the change to the requesting client, and initiate the appropriate configuration changes to apply the requested limits. For example, in a scenario in which a reduced bandwidth limit is to be applied to a compute instance implemented at an instance host, the NCS 180 may transmit the new limit to a component of a virtualization management software stack similar to stack 310 illustrated in FIG. 3 at the instance host. In some embodiments, the NCS 180 may wait until the configuration changes have been committed before sending the acknowledgement 2050.

Resource usage limit reductions may be requested for instances of any of a plurality of network-accessible services in some embodiments, such as a virtual computing service, various types of storage services, database services, and the like. In some embodiments, instead of indicating a lowered resource usage limit value directly, a client may indicate a resource budget limit that is to be met during some indicated time period. In response, the networking configuration service may monitor the resource usage of the client's service instances and determine the corresponding billing costs (e.g., by communicating with billing management components of the services involved). If a threshold close to the budget limit (or the budget limit itself) is reached, the client may be notified and/or one or more responsive actions may be taken. Thus, a resource budget limit may be treated analogously to (or translated to) a resource usage limit in at least some embodiments. It is noted that at least in some embodiments, a configuration server that supports client-requested reductions in resource usage limits need not perform at least some of the functions described earlier with respect to the NCSs 180 of FIG. 1. For example, a configuration server that responds to usage reduction request 2020 need not necessarily generate procedure graphs similar to those of FIG. 7, or classification trees similar to those of FIG. 5.

Figure 21:
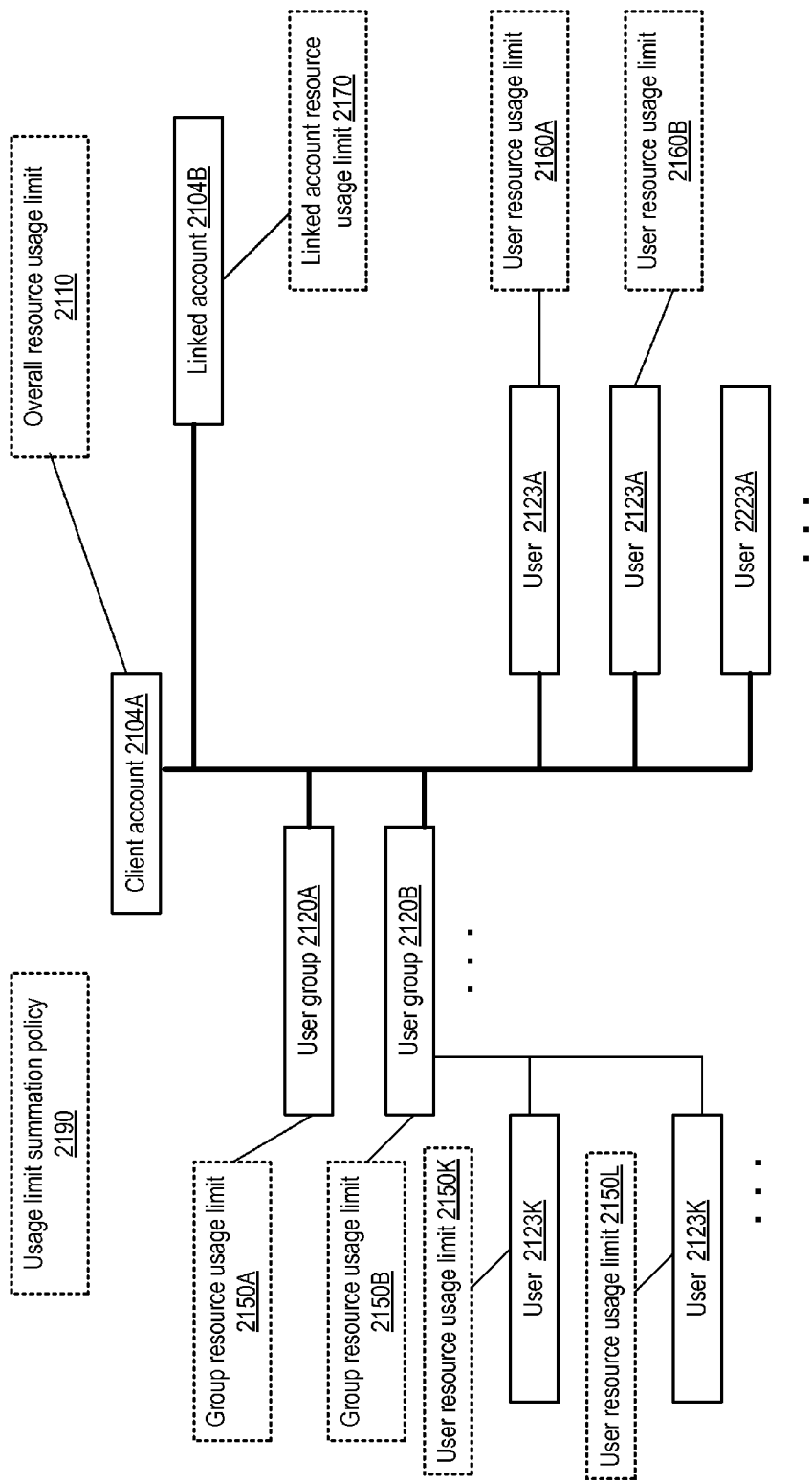
FIG. 21 illustrates an example of the establishment of an overall resource usage limit setting for a client account of a network-accessible service, and the establishment of related resource usage limit settings for user groups, individual users and linked accounts, according to at least some embodiments.

As indicated earlier, in at least some embodiments a given billable client account, e.g., an account established for an organization or entity whose personnel is to use one or more network-accessible services of a provider network, may have several different user accounts or group accounts associated with it. Distinct resource usage limits may be set for different users or groups in such embodiments. FIG. 21 illustrates an example of the establishment of an overall resource usage limit setting 2110 for a client account 2104A of a network-accessible service, and the establishment of related resource usage limit settings for user groups, individual users and linked accounts, according to at least some embodiments. As shown, client account 2104A may have one or more affiliated group accounts 2120 defined, such as user group 2120A and 2120B. Each group may in turn comprise a plurality of user accounts 2123, such as user accounts 2123K and 2123L of group 2120B. Some user accounts, such as 2123A, 2123B and 2123C, may not belong to any user groups.

In the depicted embodiment, an overall resource usage limit 2110 (such as a bandwidth limit) may be determined for all the accounts affiliated with the client account 2104A, such as the various group accounts 2120 and the user accounts 2123. One or more additional client accounts, such as account 2104B, may be linked to client account 2104A, e.g., for consolidated billing or for other purposes. In one example scenario, client account 2104A may have been set up for an organization O1 that implements a particular application using provider network resources, while client account 2104B may have been set up for a different organization O2 that partners with O1, or utilizes the application implemented by O1. Depending on the preferences of the entities for which the two client accounts are set up, the overall resource usage limit 2110 may apply to linked user accounts as well. In at least some embodiments, the measured resource usage of all the users, groups and linked accounts over a given time period may not exceed the overall resource usage limit applied to parent client account 2104A during that period, e.g., in accordance with a usage limit summation policy 2190.

In some embodiments, distinct resource usage limits may be requested for different users, groups, or linked accounts. For example, groups 2120A and 2120B may have respective limits 2150A and 2150B assigned, while users 2123A, 2123B, 2123K and 2123L may have respective limits 2160A, 2160B, 2160K and 2160L assigned. Some users (e.g., 2123C) and/or groups may not have their own limits defined, in which case their parent group limits and/or client account limits may apply. Linked account 2104B may have its own resource usage limit 2170 defined, which may also apply to users and/or groups defined within the linked account. With respect to the resource usage limits illustrated in FIG. 21, the client account 2104A may be considered a "parent" entity, while the groups, users and linked accounts may be considered "descendant" entities. A reduction in the resource usage limits applied at any of the different granularities or levels indicated in FIG. 21 may be requested in at least some embodiments, e.g., via requests similar to request 2020 of FIG. 20. If the requested reduction is to apply to a parent entity (such as client account 2104A), the manner in which the reduction affects the limits imposed on descendant entities may be indicated in the usage limit summation policy 2190. For example, in one embodiment, if a 10% reduction in bandwidth is requested for the client account as a whole, the bandwidth limits to be applied to each user or group descending from the client account may also be reduced by 10% in accordance with one selected policy 2190. In accordance with another policy 2190, as long as (a) any given descendant limit does not exceed the parent limit, and (b) the sum of the actual resource usage of all the descendant nodes over a given time period does not exceed the parent limit, the descendant limits may not be changed unless such a change is explicitly requested.

Methods for Supporting Client-Requested Resource Usage Limit Reduction

Figure 22:
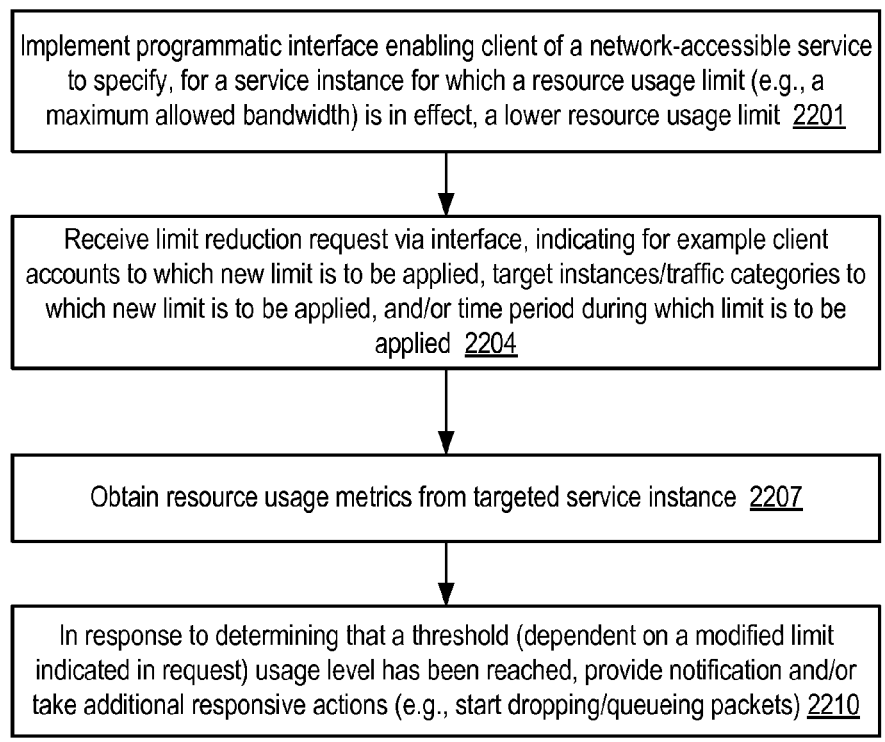
FIG. 22 illustrates aspects of operations that may be performed to enable clients to reduce resource usage limits for one or more nodes of a network-accessible service, according to at least some embodiments.

FIG. 22 illustrates aspects of operations that may be performed to enable clients to reduce resource usage limits for one or more nodes of a network-accessible service, according to at least some embodiments. As shown in element 2201, one or more programmatic interfaces may be implemented to enable clients of a network-accessible service (such as a multi-tenant virtual computing service implemented at a provider network) to request, for one or more service instances to which a resource usage limit applies, a reduction in a resource usage limit. The programmatic interfaces may include, for example, a web page or web site, one or more APIs, a GUI, or a command-line tool.

A limit reduction request may be received via one of the programmatic interfaces (element 2204), e.g., at a networking configuration server. The limit reduction request may comprise various constituent elements regarding a new limit to be applied, such as some combination of the constituents of request 2020 shown in FIG. 20. Specific client accounts, traffic categories, service instances, and/or time periods to which a reduced limit is to be applied may be indicated in the request. The appropriate configuration changes may be made in accordance with the request, e.g., in a scenario in which the limits are to be applied to compute instances, virtualization software components at the instance hosts affected may be notified regarding the new limits. Resource usage metrics may be obtained from the targeted service instances (element 2207) over time. In response to a detection that measured resource usage has reached a threshold (where the threshold may be defined in terms of the newly applied limit), a notification may be generated (e.g., to the requester of the reduced limit, or to one or more designated notification targets indicated by the requester) (element 2210). In some embodiments, other actions may be taken responsive to the detection that the threshold has been reached, e.g., if the resource usage limit applies to bandwidth, one or more packets may be dropped or queued, or in some cases the limit may be temporarily relaxed. Such a usage limit relaxation may be accompanied in some cases by a warning message (e.g., a client may be warned that although the limit has been relaxed temporarily, exceeding the limit or threshold in a sustained or repeated manner may lead to data loss). In at least some embodiments, one or more such thresholds and/or the corresponding responsive actions may be indicated by the client that requests the usage limit reduction.

Figure 23:
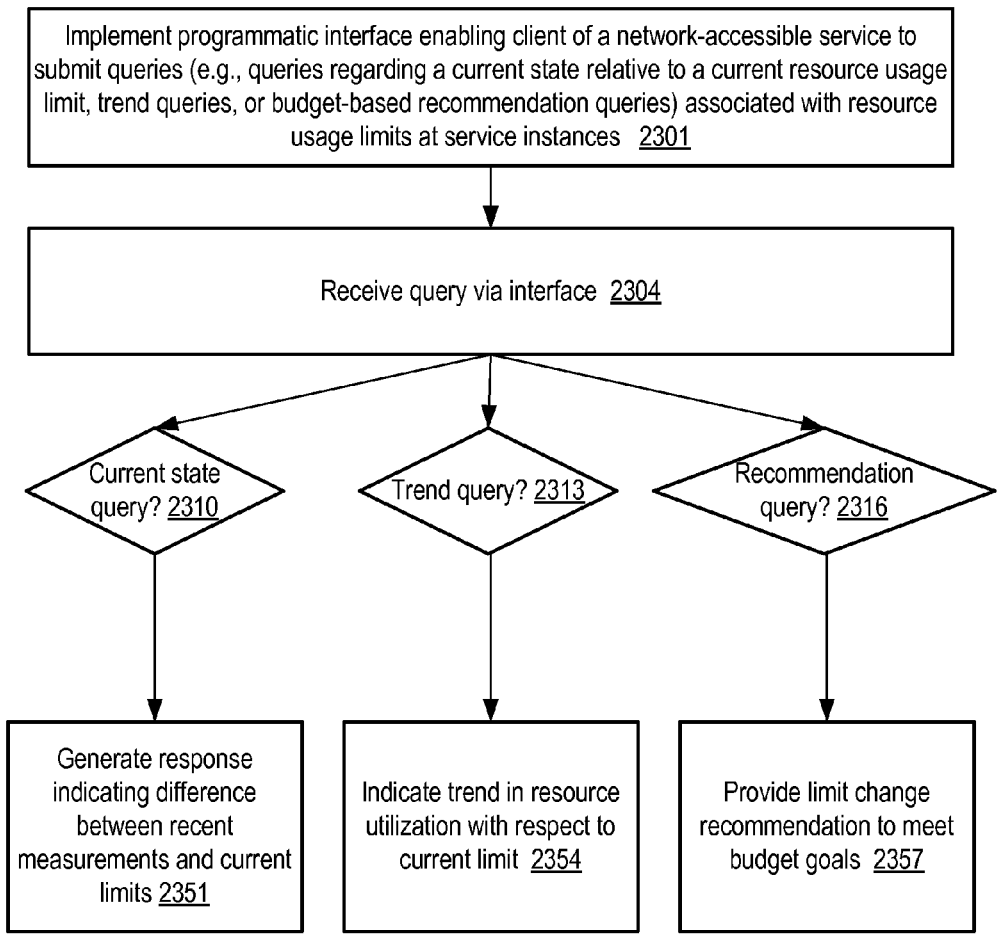
FIG. 23 illustrates aspects of operations that may be performed to enable clients to submit queries associated with resource usage limits at nodes of a distributed system, according to at least some embodiments.

FIG. 23 illustrates aspects of operations that may be performed to enable clients to submit queries associated with resource usage limits at nodes of a distributed system, according to at least some embodiments. As shown in element 2301, one or more programmatic interfaces may be implemented for various types of queries. Some clients may, for example, wish to determine a current state or metric of resource usage, relative to the currently applicable limit. In another scenario, a client may wish to obtain trend information regarding the changes in resource usage over time at one or more specified service instances, so that for example the client is able to anticipate when resource usage limits need to be changed. In yet another scenario, budget-based queries regarding resource usage may be supported by a networking configuration server—for example, a client may indicate a target budget limit for networking with respect to some service instances, and request recommendations for changes to bandwidth limits that can help keep the client's costs under the budget. A query may be received from a client via one of the programmatic interfaces (element 2304). Depending on the type of query, different actions may be taken based on metrics collected from the service instances to which the query applies.

If the query pertains to a current state of resource usage (element 2310), a response indicating the differences between recent measurements of resource usage and the applicable limits at the service instances may be provided (element 2351). If a trend query is received (element 2313), a response that indicates the variation in resource usage over a selected time interval may be provided (element 2354). If a budget-based recommendation query is received (element 2316), the networking configuration server may perform the computations necessary to determine one or more usage limit reductions that would enable the client to achieve the budget goals, and provide the results of the computations in a query response (element 2357). Other types of queries may be supported in some embodiments.

It is noted that in various embodiments, operations other than those illustrated in the flow diagrams of FIGS. 10, 11, 12, 13, 18, 22 and 23 may be used to implement various aspects of the networking configuration functionality described, and that some of the operations shown may not be implemented, or may be implemented in a different order, or in parallel rather than sequentially. For example, it may be the case that in some embodiments a multi-threaded NCS may be implemented, in which case several streams of the operations illustrated in FIG. 10 may be executed in parallel to generate and transmit respective sets of classification metadata for respective target nodes.

Use Cases

The techniques described above, of establishing a centralized set of networking configuration servers to shape network traffic at numerous nodes of a distributed system, provide heat-map based resource visualization capabilities, and enable client-requested reductions in resource usage limits, may be useful in a number of scenarios. For example, provider networks may comprise hundreds of thousands of instance hosts and large numbers of network devices distributed among several data centers, with at least a portion of the provider network's revenue being derived based on the amount of network traffic that flows in and out of the instance hosts. Using local modules at each instance host or network device to make networking management decisions may lead to a number of problems in such large environments. First, it may not be possible to obtain, at a given instance host, all the inputs necessary to make intelligent networking management decisions. Second, the complexity of the decision logic required at the instance hosts may require a substantial amount of computing capability of the instance host, which may reduce the computing power left for client-requested service instances. When changes to the networking management logic need to be made, they may have to be transmitted and applied to all the instance hosts, which may itself be a resource-intensive and error-prone exercise.

In contrast, by isolating the decision logic to be used for traffic shaping to a few networking configuration servers, inputs from a larger set of sources may be collected, leading to more informed decisions. The networking configuration servers may be implemented using dedicated computing resources that do not have to be shared with other services, avoiding contention for computing power. Updates to the networking configuration logic may be applied much more easily than if hundreds or thousands of instance hosts had to be updated. The centralized networking configuration service may be able to easily provide clients with unified views of networking status (including configurable heat maps) that would otherwise have been difficult to obtain. The ability to reduce resource usage limits programmatically for specified service instances, user accounts or group accounts may be helpful to clients that wish to control budgets.

Illustrative Computer System

Figure 24:
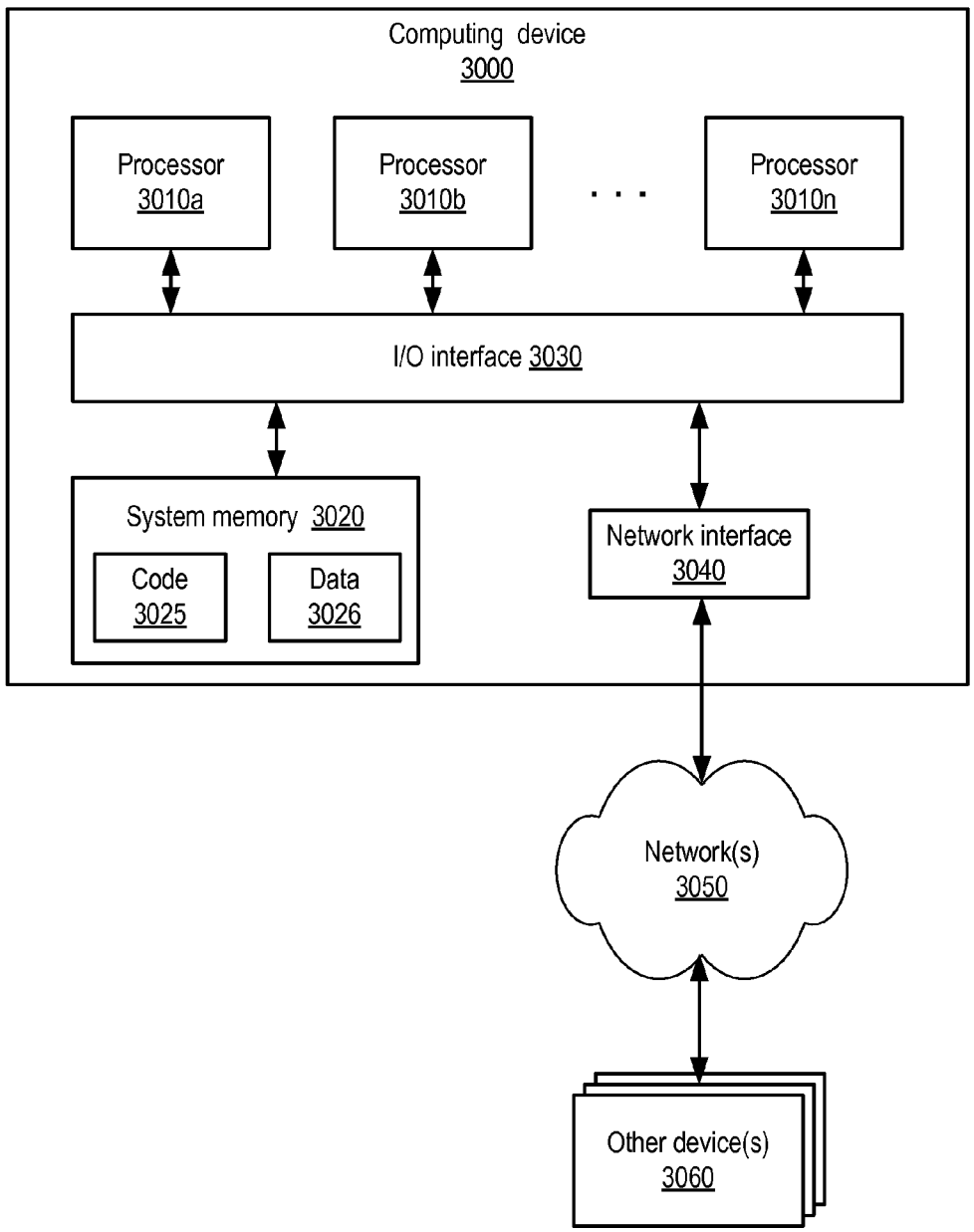
FIG. 24 is a block diagram illustrating an example computing device that may be used in at least some embodiments.

In at least some embodiments, a server that implements a portion or all of one or more of the technologies described herein, including the techniques to implement the networking configuration servers, networking configuration service managers, topology visualization servers, and/or instance hosts, may include a general-purpose computer system that includes or is configured to access one or more computer-accessible media. FIG. 24 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 23, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 23 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 24 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a plurality of computing devices configured to:
        implement one or more programmatic interfaces enabling a client to request an imposition, during at least a time interval, of a lower resource usage limit than an existing resource usage limit in effect at the time of the request at one or more service instances of a multi-tenant network-accessible service of a provider network, wherein the lower resource usage limit is to be applied to at least one category of network traffic with a resource usage dependent pricing policy;
        receive a client request, via a particular interface of the one or more programmatic interfaces, indicating a particular lower resource usage limit to be imposed on the at least one category of network traffic at a particular service instance of the multi-tenant network-accessible service, wherein the particular lower resource usage limit indicated by the client request is lower than a particular existing resource usage limit in effect at the time of the client request that is imposed on the at least one category of network traffic at the particular service instance of the multi-tenant network-accessible service;
        obtain resource usage metrics corresponding to one or more categories of network traffic at the particular service instance; and
        in response to a determination that resource usage associated with network traffic at the particular service instance has reached a threshold level determined at least in part from the particular lower resource usage limit, initiate one or more responsive actions including a generation of a notification.

2. The system as recited in claim 1, wherein the particular lower resource usage limit comprises an indication of one of: (a) an average traffic transmission rate that is not to be exceeded, (b) a peak traffic transmission rate that is not to be exceeded, (c) an upper limit to a number of bytes of data transferred, or (d) an upper limit on the number of network messages transferred.

3. The system as recited in claim 1, wherein the client request indicates a particular category of network traffic to which the particular lower resource usage limit is to be applied, wherein the particular category is selected from a plurality of categories of network traffic associated with the service including one or more of: (a) traffic flowing over one or more public Internet links (b) traffic flowing within a provider network data center (c) traffic flowing between two provider network data centers (d) traffic flowing between the particular service instance and nodes of a different service implemented at the provider network.

4. The system as recited in claim 1, wherein the client request indicates one or more directions of network traffic flow to which the lower resource usage limit is to be applied, including one of: (a) traffic flowing from the particular service instance to one or more destinations; (b) traffic flowing to the particular service instance from one or more sources.

5. The system as recited in claim 1, wherein the client request indicates a particular user account of a plurality of user accounts established on behalf of a particular client at the multi-tenant network-accessible service, wherein the lower resource usage limit is to be applied to the particular user account, and wherein a different resource usage limit applies to a different user account of the plurality of user accounts established on behalf of the particular client.

6. A method, comprising:
    performing, by a plurality of computing devices:
        implementing a programmatic interface enabling a client to request an imposition of a lower resource usage limit than an existing resource usage limit in effect at the time of the request at one or more service instances of a network-accessible service, wherein the lower resource usage limit is to be applied to at least one category of network traffic associated with the service;
        receiving a client request, via a particular interface of the one or more programmatic interfaces, indicating a particular lower resource usage limit to be imposed on the at least one category of network traffic at a particular service instance of the service, wherein the particular lower resource usage limit indicated by the client request is lower than a particular existing resource usage limit in effect at the time of the client request that is imposed on the at least one category of network traffic at the particular service instance of the service;
        obtaining resource usage metrics corresponding to one or more categories of network traffic at the particular service instance; and
        in response to determining that resource usage associated with network traffic at the particular service instance has reached a threshold level determined at least in part from the particular lower resource usage limit, initiating one or more responsive actions.

7. The method as recited in claim 6, wherein the particular lower resource usage limit comprises an indication of one of: (a) an average traffic transmission rate that is not to be exceeded, (b) a burst traffic transmission rate that is not to be exceeded, (c) an upper limit to a number of bytes of data transferred, or (d) an upper limit on the number of network messages transferred.

8. The method as recited in claim 6, wherein the client request indicates a particular category of network traffic to which the particular lower resource usage limit is to be applied, wherein the particular category is selected from a plurality of categories of network traffic associated with the service including one or more of: (a) traffic flowing over one or more public Internet links (b) traffic flowing within a provider network data center (c) traffic flowing between two provider network data centers (d) traffic flowing between nodes of the service and nodes of a different service implemented at a provider network.

9. The method as recited in claim 6, wherein the client request indicates one or more directions of network traffic flow to which the lower resource usage limit is to be applied, including one of: (a) traffic flowing from the particular service instance to one or more destination endpoints; (b) traffic flowing to the particular service instance from one or more sources.

10. The method as recited in claim 6, wherein the client request indicates a particular user account of a plurality of user accounts established on behalf of a client at the multi-tenant network-accessible service, wherein the lower resource usage limit is to be applied to the particular user account, and wherein a different resource usage limit applies to a different user account of the plurality of user accounts.

11. The method as recited in claim 6, wherein the one or more responsive actions comprise one of: (a) discarding one or more packets, (b) queuing one or more packets, or (c) increasing, for a particular time period, the resource usage limit to be imposed on network traffic at the particular service instance.

12. The method as recited in claim 6, further comprising performing, by the one or more computing devices:
    implementing a different programmatic interface enabling a client to determine a measured resource usage associated with network traffic at the particular service instance; and
    in response to a request received via the different programmatic interface, providing an indication of the measured resource usage.

13. The method as recited in claim 6, wherein the client request includes an indication of a time period during which the particular lower resource usage limit is to be imposed.

14. The method as recited in claim 6, wherein the client request includes an indication of one of: (a) the threshold level, or (b) a particular responsive action of the one or more responsive actions.

15. The method as recited in claim 6, wherein the network-accessible service is implemented using instance hosts of a provider network, further comprising performing, by the one or more computing devices:
    receiving, at a particular server of a centralized networking configuration service of the provider network, a plurality of client requests for respective lower resource usage limits at specified service instances; and
    transmitting, from the particular server to respective control modules instantiated at respective instance hosts of the specified service instances, indications of the respective lower resource usage limits.

16. A non-transitory computer-accessible storage medium storing program instructions that when executed on one or more processors:
    receive, via a programmatic interface, a client request indicating a particular lower resource usage limit to be imposed on at least one category of network traffic at a particular instance of a network-accessible service, wherein the particular lower resource usage limit indicated by the client request is lower than a particular existing resource usage limit in effect at the time of the client request that is imposed on the at least one category of network traffic at the particular instance of the network-accessible service;
    obtain resource usage metrics corresponding to one or more categories of network traffic at the particular instance; and
    in response to a determination that resource usage associated with network traffic at the particular instance has reached a threshold level, initiate one or more responsive actions.

17. The non-transitory computer-accessible storage medium as recited in claim 16, wherein the instructions when executed on the one or more processors:
    receive a different client request indicating a combined resource usage limit to be imposed collectively on network traffic at a first and a second instance of the network-accessible service; and
    in response to a determination that a sum of the resource usage associated with network traffic at the first and second instances has reached a threshold level, initiate one or more responsive actions.

18. The non-transitory computer-accessible storage medium as recited in claim 16, wherein the network-accessible service comprises one of: (a) a virtual computing service, (b) a storage service, or (c) a database service.

19. The non-transitory computer-accessible storage medium as recited in claim 16, wherein instructions when executed on the one or more processors:
    receive a different client request indicating a client budget upper bound for networking resources at a different instance of the network-accessible service; and
    in response to a determination that client billing costs associated with networking resources at the different instance exceed a threshold, initiate one or more responsive actions.

20. The non-transitory computer-accessible storage medium as recited in claim 16, wherein the particular lower resource usage limit comprises an indication of one of: (a) an average traffic transmission rate that is not to be exceeded, (b) a burst traffic transmission rate that is not to be exceeded, (c) an upper limit to a number of bytes of data transferred, or (d) an upper limit on the number of network messages transferred.

* * * * *